US007655148B2

(12) United States Patent
Chen et al.

(10) Patent No.: US 7,655,148 B2
(45) Date of Patent: Feb. 2, 2010

(54) WATER TREATMENT COMPOSITIONS AND METHODS OF MAKING AND USING

(75) Inventors: Huimin Chen, Willington, CT (US); Meidong Wang, Willington, CT (US); T. Danny Xiao, Willington, CT (US); Dennis A. Clifford, Houston, TX (US)

(73) Assignees: Inframat Corporation, Farmington, CT (US); The University of Houston, Houston, TX (US)

( * ) Notice: Subject to any disclaimer, the term of this patent is extended or adjusted under 35 U.S.C. 154(b) by 76 days.

(21) Appl. No.: 11/581,504

(22) Filed: Oct. 16, 2006

(65) Prior Publication Data
US 2007/0086935 A1    Apr. 19, 2007

Related U.S. Application Data

(60) Provisional application No. 60/726,924, filed on Oct. 14, 2005.

(51) Int. Cl.
*C02F 3/00* (2006.01)
(52) U.S. Cl. .................. 210/688; 977/903; 977/810
(58) Field of Classification Search .......... 428/306.6; 977/810, 903; 210/688
See application file for complete search history.

(56) References Cited

U.S. PATENT DOCUMENTS

| | | | |
|---|---|---|---|
| 5,234,603 A | 8/1993 | Potts | |
| 5,700,974 A * | 12/1997 | Taylor | 149/109.6 |
| 6,123,854 A | 9/2000 | Iwane et al. | |
| 6,162,530 A * | 12/2000 | Xiao et al. | 428/292.1 |
| 6,383,395 B1 | 5/2002 | Clarke et al. | |
| 6,517,802 B1 | 2/2003 | Xiao et al. | |
| 6,596,915 B1 * | 7/2003 | Satyapal et al. | 588/313 |
| 6,764,601 B1 * | 7/2004 | Levy et al. | 210/660 |
| 7,211,320 B1 * | 5/2007 | Cooper et al. | 428/306.6 |
| 2003/0055302 A1 | 3/2003 | Cheung et al. | |
| 2004/0164029 A1 | 8/2004 | Souter et al. | |
| 2005/0263441 A1 * | 12/2005 | Antonio et al. | 208/244 |
| 2006/0078726 A1 * | 4/2006 | Antonio et al. | 428/328 |

FOREIGN PATENT DOCUMENTS

| | | |
|---|---|---|
| DE | 19923625 A1 | 11/2000 |
| EP | 1132343 A2 | 2/2001 |
| WO | 0220396 A2 | 3/2002 |
| WO | 0226631 A1 | 4/2002 |
| WO | 03068683 A1 | 8/2003 |

(Continued)

OTHER PUBLICATIONS

Abe, M., Inorganic Ion Exchange Materials, 1982, p. 161-273, Chapter 6, CRC Press, Boca Raton, Florida.

(Continued)

*Primary Examiner*—Chester T Barry
(74) *Attorney, Agent, or Firm*—Cantor Colburn LLP

(57) ABSTRACT

A water treatment composition includes an oxidizing component and an adsorbing component, wherein one or both of the oxidizing component and adsorbing component comprise nanostructured materials. The water treatment compositions are useful in at least partially removing contaminants such as metallic or cationic arsenic, lead, chromium, and/or mercury from water.

18 Claims, 18 Drawing Sheets

FOREIGN PATENT DOCUMENTS

| WO | 2004032624 A1 | 4/2004 |
|----|---------------|--------|
| WO | 2004065619 A1 | 4/2004 |
| WO | 2006065825 A2 | 6/2006 |
| WO | 2006087432 A1 | 8/2006 |
| WO | 2007047624 A1 | 4/2007 |

OTHER PUBLICATIONS

Anderson, T.C. et al, A radium Assay Technique Using Hydrous Titanium Oxide Adsorbent for the Sudbury Neutrino Observatory, Nuclear Instruments and Mthods of Physics in Research, 2003, p. 386-398, 501, Elsevier Science B.V.

Badruzzaman, Mohammad et al, The Application of Rapid Small—Scale Column Tests in Iron-based Packed Bed Arsenic Treatment Systems, Advances in Arsenic Research, 2005, p. 268-283, Chapter 19, American Chemical Society, Washington, D.C.

Chen, C.J. et al, Atherogenicity and Carcinogenecity of High-Arsenic Artesian Well Water, Arteriosclerosis, 1988, p. 452-460 vol. 8, No. 5, Institute of Public Health, Taipei, Taiwan.

Clifford, D.A., Ion Exchange and Inorganic Adsorption, Water Quality and Treatment, 1999, p. 561-639, Cahpter 9, 5th Edition, McGraw Hill.

Clifford, D.A., et al, Arsenic Chemistry and Speciation, Proceeding Water Quality Technology Conference, 1993, p. 1955-1969, American Water Works Association, Denver, Colorado.

Crittenden, John C et al., Design of Rapid Small—Scale Adsorption Tests for a Constant Diffusivity, Journal WPCF, 1986, p. 312-319, vol. 58, No. 4.

Ferreccio, C. et al, Lung Cancer and Arsenic Concentrations in Drinking Water in Chile, Epidemiol, 1999, p. 673-679, 200011(6), Lippincott Williams and Wilkins, Inc., Washington, D.C.

Ganesh Ghrye et al., Laboratory Study on the Oxidation of Arsenic III to Arsenic V, 2001, EPA/600/R-01/021.

Guhamazumder, D.N. et al, Arsenic Levels in Drinking Water and the Prevalence of Skin Lesions in West Bengal, International Journal of Epidemiology, 1998, p. 871-877, 27 (5), International Epidemiology Association.

Hasany, S.M. et al, Sorption of Selenium at Micromolar Levels onto Hydrous Titanium Oxide from Aqueous Solutions using Radiotracer Technique, Appl. Radiat. Isot., 1997, p. 595-600, vol. 48, Elsevier Science Ltd., Great Britain.

Hathaway, S.W. et al, Removing Arsenic from Drinking Water, 1987, p. 61-65, 79 (8), Journal AWWA.

Hering, J.G., Arsenic Removal by Ferric Chloride, 1996, p. 155-167, 88 (4), AWWA.

Mustafa, S. et al, Surface Properties of the Mixed Oxides of Iron and Silica, Colloides and Surfaces, Physicochemical and Engineering Aspects, 2002, p. 273-282, Elsevier Science B.V.

Rosenblum, E.R. et al, The Equilibrium Arsenic Capacity of Activated Alumina, EPA, 1984, 600/52-83-107, Cincinnati, Ohio.

Rubel, Jr, Frederick, Removal of Arsenic from Drinking Water by Adsorptive Media, EPA/600/R-03-019, US Enviornmental Protection Agency, 2003, Cincinnati, Ohio.

Ruvarac, A. Inorganic Ion Exchange Materials, 1982, p. 142-160, Chapter 5, Clearfield CRC Press, Boca Raton, Florida.

Samanta, G., Preservation and Field-Preservation of Inorganic Arsenic Species in Groundwater, Water Quality Research Journal of Canada, 2006, p. 107-116, 41 (2), Houston, Texas.

Tom Sorg et al, Treatment Options Part 1, Water Supply and Water Resources Division Office of Research and Development, Cincinnati, Ohio.

Suzuki, T.M. et al, Preparation of Porous Resin Loaded with Crystalline Hydrous Zirconium Oxide and its Application to the Removal of Arsenic, Reactive and Functional Polymers, 2000, p. 165-172, Elsevier Science B.V.

Vassileva,E. et al., Chromium Speciation Analysis by Solid-Phase Extraction on a High Surface Area TiO2 Analyst, The Analyst, 2000, p. 125; 693-698, The Royal Society of Chemistry.

Vesely, V. et al, Synthetic Inorganic Ion-Exchangers-I, Talanta Review, 1972, p. 219-262, Nuclear Research Institute of the Czechoslovak Academy of Sciences.

Samanta G. and Clifford D., "Study on Preservation of Inorganic Arsenic Species in Groundwaters", Environmental Science and Technology, 2005, 39(22), 8877-8882, American Chemical Society.

International Search Report, PCT/US2007/013911, Apr. 3, 2008.

Chen et al., U.S. Appl. No. 60/813,434, filed Jun. 14, 2006.

International Search Report, PCT/US2006/040458, Mar. 28, 2007.

* cited by examiner (a)                                   (b)

US 7,655,148 B2

WATER TREATMENT COMPOSITIONS AND METHODS OF MAKING AND USING

CROSS REFERENCE TO RELATED APPLICATION

This application claims the benefit of U.S. Provisional Patent Application Ser. No. 60/726,924 filed Oct. 14, 2005, which is incorporated herein by reference in its entirety.

STATEMENT REGARDING FEDERALLY SPONSORED RESEARCH

The United States Government has certain rights to this disclosure pursuant to United States Air Force Flight Test Center Contract Nos. F04611-03-M-1007 and FA9300-04-C-0033.

BACKGROUND

The present disclosure generally relates to water treatment. More particularly, the present disclosure relates to compositions and methods for removal of contaminants from aqueous streams.

Wastewater and natural waters (e.g., surface water or groundwater) may contain a variety of dissolved inorganic substances from natural and anthropogenic sources. Regulatory limits have been set for a number of these substances in drinking water and for discharges to natural waters, for protection of public health and of environmental quality. In many locations, the regulatory limits for many of these substances are set at very low levels, e.g., about 2 to about 50 micrograms per liter (µg/L).

Current water treatment processes, such as granular iron media adsorption, modified coagulation/filtration, reverse osmosis hyperfiltration, anion exchange, activated alumina adsorption, modified lime softening, electrodialysis reversal, and oxidation/filtration, are available and cost-effective for large municipal water treatment facilities. However, as the regulated levels of these contaminants are reduced even further, many of these processes are rendered inadequate. Furthermore, improvements on these technologies or creation of new technologies are needed for small water treatment systems (e.g., those that serve communities of 25 to 10,000 people) and point-of-use or point-of-entry systems (e.g., those for use in private wells) to treat water cost-effectively.

There accordingly remains a need in the art for improved compositions and methods for removing contaminants from aqueous streams.

BRIEF SUMMARY

Disclosed herein are water treatment compositions. In one embodiment, a water treatment composition includes an oxidizing component and an adsorbing component, wherein one or both of the oxidizing component and adsorbing component comprise nanostructured materials.

In another embodiment, the water treatment composition includes a nanostructured manganese containing composition and a nanostructured adsorbing component, wherein the nanostructure manganese-containing composition and the nanostructured adsorbing component are agglomerated to form a particle having an average longest dimension of at least one micrometer.

A method for treating water includes contacting water with the water treatment composition and at least partially removing a contaminant from the water.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
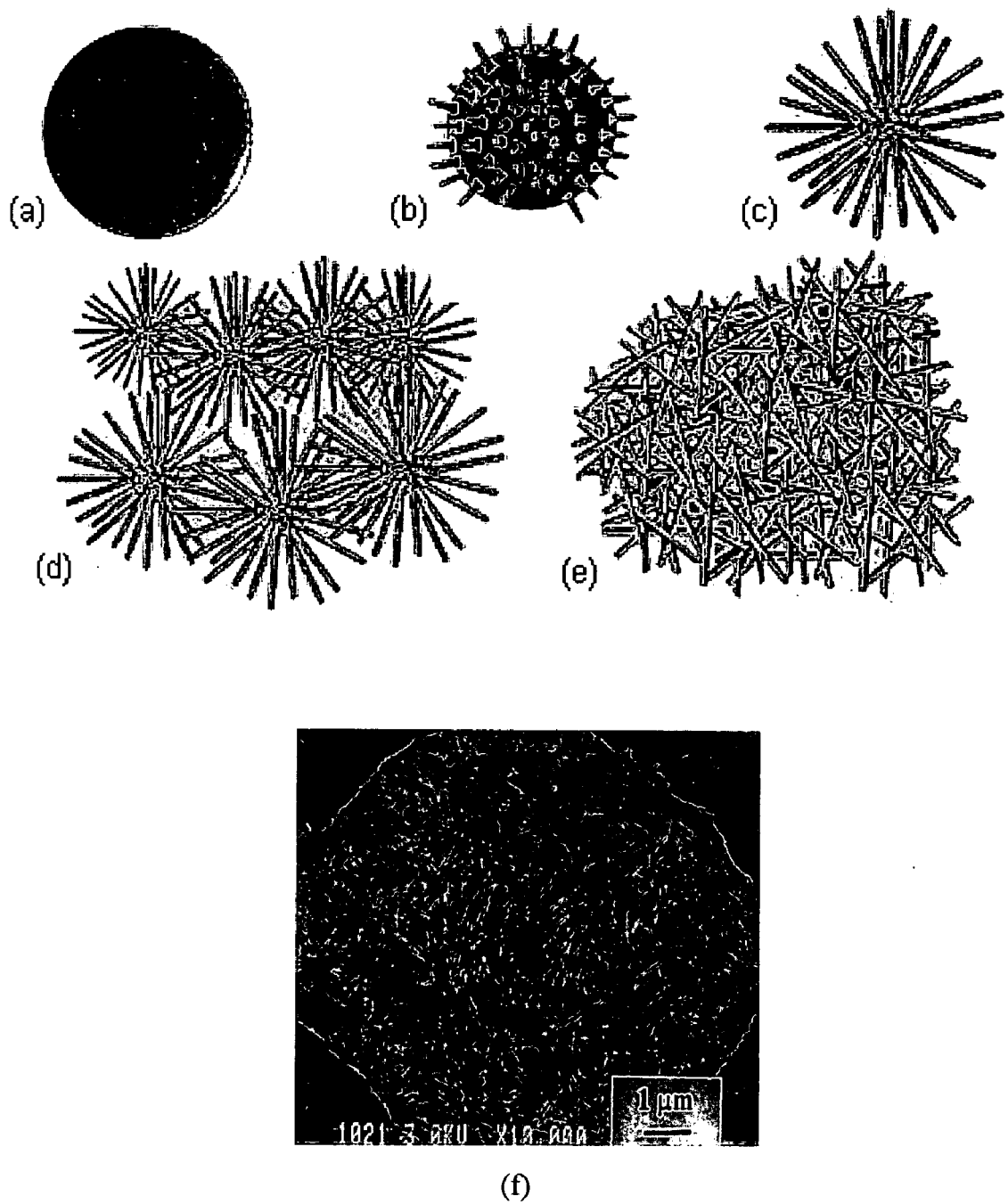
FIG. 1 schematically illustrates the transformation of $MnO_2$ nanoparticle agglomerates into a mass of interconnected nanofibers, starting with (a) a nanoparticle, then (b) nucleation of embryonic nanofibers, followed by (c) transformed long fibers, (d) fiber bundles, and finally (e) a fully developed bird's-nest superstructure, which is also shown in (f) a scanning electron microscope (SEM) image.

Disclosed herein are water treatment compositions and methods of making and using the water treatment compositions. The water treatment compositions are useful for removing contaminants from water. Specific contaminants include metallic or cationic arsenic, lead, chromium, mercury, or a combination comprising at least one of the foregoing.

In contrast to the prior art, the water treatment compositions generally comprise both an oxidizing component and an adsorbing component. The oxidizing component and/or the adsorbing component may be nanostructured. In an exemplary embodiment, both the oxidizing component and the adsorbing component are nanostructured. The term "nanostructured", as used herein, refers to particles having an average longest grain dimension of less than about 250 nanometers (nm). One or both of the oxidizing component and adsorbing component comprising the nanostructured materials can be agglomerated to form particles having an average longest dimension of at least one micrometer.

The oxidizing component can include a manganese-, silver-, and/or titanium-containing composition. Suitable compositions include oxides, hydroxides, or oxyhydroxides of manganese, silver, or titanium. The adsorbing component can include a titanium-, zirconium-, aluminum-, and/or iron-containing composition. Suitable compositions include oxides, hydroxides, or oxyhydroxides of titanium, zirconium, aluminum, or iron. The oxidizing component can be doped. In addition, or in the alternative, the adsorbing component can be doped. It should be noted that the oxidizing component and the adsorbing component must have different nominal compositions. That is, while the oxidizing component and the adsorbing component can have overlapping elements or constituents, the overall composition of each component must be different.

In an exemplary embodiment, the oxidizing component is a manganese oxide an iron-doped manganese oxide, or a combination comprising at least one of the foregoing; and the adsorbing component is an iron oxide, a Mn- or La-doped iron oxide, a zirconium hydroxide, a Mn- or Fe-doped zirconium hydroxide, a titanium hydroxide, a Mn- or Fe-doped titanium hydroxide, or a combination comprising at least one of the foregoing.

Desirably, the overall water treatment composition is highly porous so as to allow the treated water to flow therethrough, yet also absorb contaminants during treatment. In an exemplary embodiment, one or both of the oxidizing component and the adsorbing component has a so-called "bird's nest" fibrous structure, as shown in FIG. 1(e) and (f).

The water treatment compositions can be disposed onto a carrier and/or incorporated into a filtration device.

A method for using any of the water treatment compositions disclosed herein generally includes contacting water with the water treatment composition and at least partially removing a contaminant from the water. In one embodiment, at least partially removing the contaminant can include oxidizing the contaminant and adsorbing the oxidized contaminant.

The adsorption of a contaminant onto the water treatment compositions generally occurs by ligand exchange. Advantageously, because these contaminants strongly bond to the water treatment media, the media, once exhausted, can be disposed of as a non-hazardous waste in landfills.

The disclosure is further illustrated by the following non-limiting examples.

EXAMPLE 1

Manganese Dioxide Nanofiber Synthesis and Characterization $MnO_2$ was synthesized by oxidizing manganese sulfate ($MnSO_4$) with potassium permanganate ($KMnO_4$) under acidic conditions according to reaction (1).

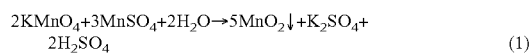

$$2KMnO_4 + 3MnSO_4 + 2H_2O \rightarrow 5MnO_2\downarrow + K_2SO_4 + 2H_2SO_4 \quad (1)$$

The reaction time and temperature were adjusted to control the crystallinity, morphology and catalytic activity of the material. A schematic illustration showing the gradual transformation of $MnO_2$ nanoparticle agglomerates into a mass of interconnected nanofibers is shown in FIG. 1. These transformations can be controlled by adjusting time and/or temperature of the reaction. It is believed that the $MnO_2$ is more active in the nucleation and growth stages than during the other stages.

Figure 2:
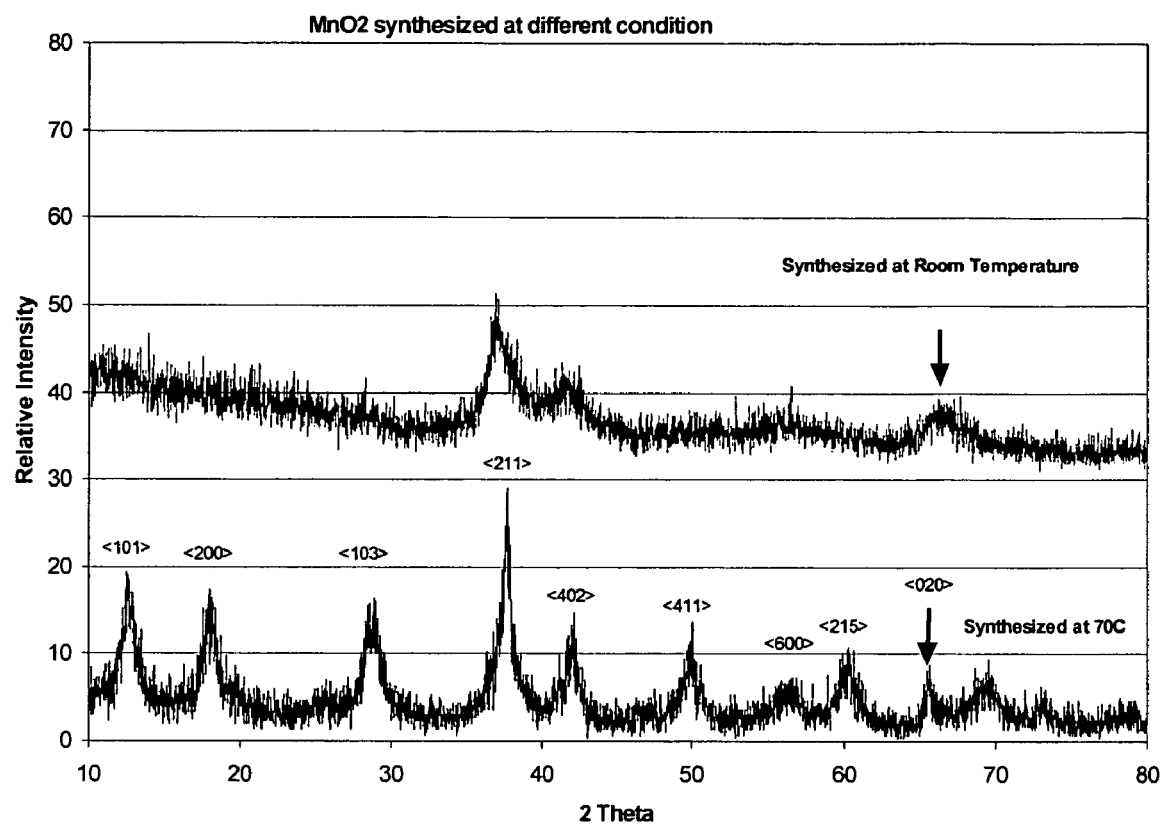
FIG. 2 illustrates powder X-ray diffraction patterns for two different samples of $MnO_2$.

Powder X-ray diffraction (XRD) patterns of the $MnO_2$ were obtained on a Bruker D5005 or D8 diffractometer equipped with a 2.2 kilowatt (kW) Cu X-ray tubes. The equipment was run at 40 kilovolt (kv) and 20 milliAmpere (mA) by step-scanning with increments of 5 degrees per minute (°/min). XRD analysis (as shown in FIG. 2) revealed that synthesis temperature had a great influence on the crystallinity. The $MnO_2$ material synthesized at 70 degrees Celsius (° C.) possessed better crystallinity than the one synthesized at room temperature (about 23° C.). The peak associated with the <020> direction was narrower than all other peaks, indicating that the crystallites were elongated along the <020> direction. In addition, the broadness of this peak is associated with the length of fiber. Specifically, the broader the peak the shorter the fiber. It is apparent that the <020> peak of $MnO_2$ synthesized at room temperature was much broader compared with that synthesized at 70° C., suggesting that the $MnO_2$ synthesized at room temperature had a shorter fiber length.

Figure 3:
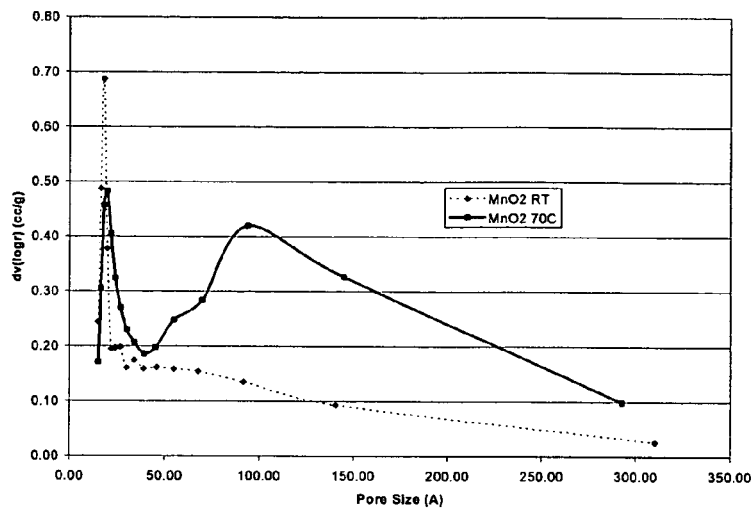
FIG. 3 graphically illustrates the mesopore size distribution of $MnO_2$ synthesized at room temperature and 70 degrees Celsius (° C.)

Specific surface area (SSA), total pore volume, micropore volume, and mesopore size distribution of the as-synthesized $MnO_2$ nanofibers were analyzed on a QuantaChrome NOVA4200e surface area and pore size analyzer using the BET method. SSA and pore analyses of $MnO_2$ samples are listed in Table 1. Pores are classified by diameter as micropores (<10 Å), mesopores (10 to 250 Å) and macropores (>250 Å). The $MnO_2$ synthesized at room temperature possessed a higher SSA than the $MnO_2$ synthesized at 70° C., although its total pore volume was lower. This suggested that it had a smaller particle size, contained micropores, or both. The results shown in Table 1 confirmed that $MnO_2$ synthesized at room temperature contained micropores, which contributed about 75 square meters per gram ($m^2/g$) of its 259 $m^2/g$ SSA. Mesopore size distributions of these two materials are shown in FIG. 3.

TABLE 1

BET surface area and pore analyses

| $MnO_2$ | SSA ($m^2/g$) | Total Pore Volume (cc/g) | Micropore Volume (cc/g) | Micropore Area ($m^2/g$) | Mesopore size distribution |
|---|---|---|---|---|---|
| Room Temp | 259 | 0.29 | 0.04 | 75 | Peak at 18 Å |
| 70° C. | 190 | 0.39 | 0 | 0 | Peaks at 20 and 93 Å. |

The $MnO_2$ synthesized at room temperature exhibited a singular pore size distribution with a pore radius peak of about 17 Angstroms (Å). In contrast, the $MnO_2$ synthesized at 70° C. exhibited a bimodal pore size distribution with pore radii peaks at about 20 Å and about 93 Å, respectively. The 93 Å peak was much broader than the 20 Å peak; it covered a pore radius from about 50 Å to about 300 Å. Most pores in this range were interparticle voids that formed among particles. Theoretically, both micropores and mesopores are accessible for arsenic species in the water, because the radius of arsenic ions, such as $AsO_4^{3-}$ with r=0.47 Å and $H_3AsO_3$ with r=0.69 Å, are much smaller than the sizes of the observed micropores and mesopores.

Figure 4:
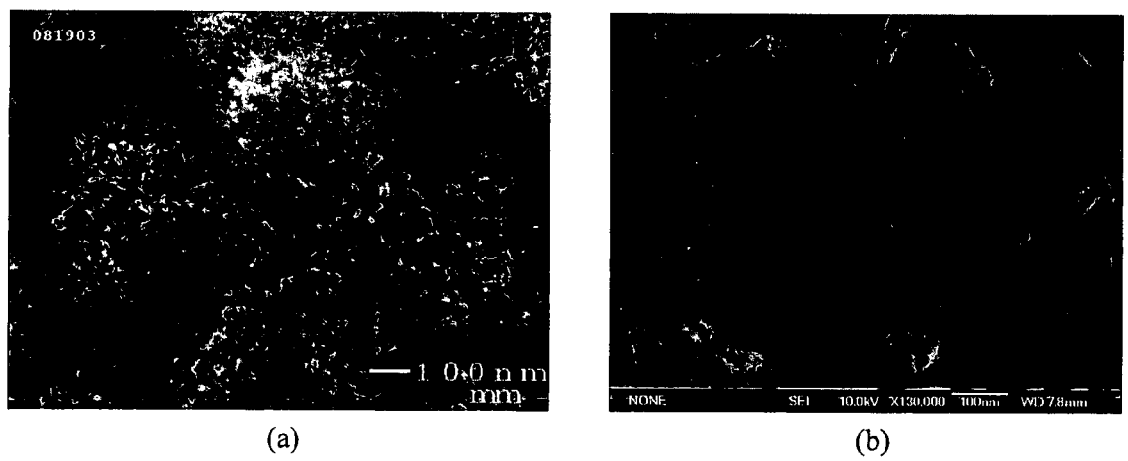
FIG. 4 illustrates high resolution scanning electron microscope (HR-SEM) images of $MnO_2$ synthesized at (a) room temperature and (b) 70° C.

High resolution scanning electron microscope (HR-SEM) images were acquired at 10 kilo-electron Volts (KeV) using a Jeol 890 inlens SEM. HR-SEM images of $MnO_2$ are shown in FIG. 4. The $MnO_2$ synthesized at room temperature appeared to have a spiked ball morphology, while the $MnO_2$ synthesized at 70° C. exhibited a nanofiber morphology. Based on FIG. 1, the $MnO_2$ synthesized at room temperature appeared to still be in the growing stage. This is consistent with the XRD results that the $MnO_2$ synthesize at room temperature had a shorter fiber length.

Figure 5:
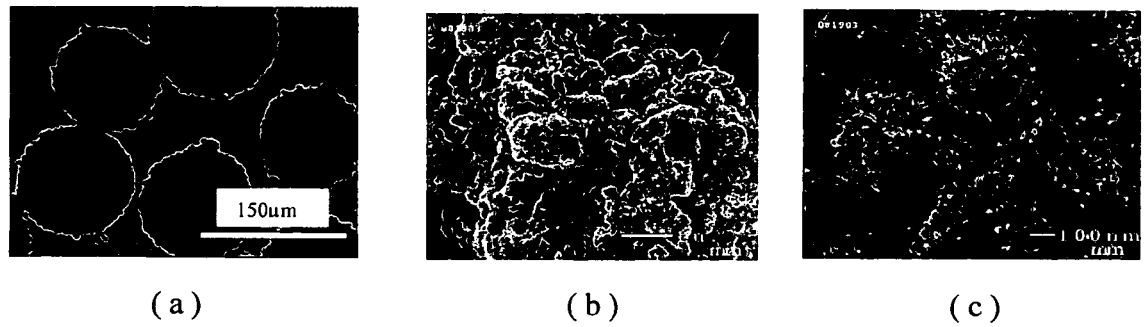
FIG. 5 illustrates (a) an optical microscope image of reconstituted $MnO_2$ particles having a particle size greater than 150 micrometers as well as (b and c) SEM images of reconstituted nanofibrous $MnO_2$ particles.

It was also observed that interparticle voids formed among $MnO_2$ spikes about 50 Å to about 300 Å. This is consistent with pore size distribution results. Optical and scanning electronic microscope images of reconstituted $MnO_2$ particles are shown in FIG. 5. Spray drying was used to reconstitute the nanoporous $MnO_2$ powder. The optical microscope image in FIG. 5(a) showed that the reconstituted $MnO_2$ particles were substantially spherical with diameters of greater than or equal to about 150 micrometers. The SEM image of the reconstituted nanofibrous $MnO_2$ particles in FIG. 5(b) shows that each sphere comprises hundreds of agglomerated particles having a size range from submicrometers to a few micrometers. An increase in magnification, as shown in the SEM image of 5(c), shows that each agglomerate comprises a plurality of spiked balls of $MnO_2$, with macropores among the bundles and mesopores among the spikes.

EXAMPLE 2

Evaluation of $MnO_2$ for Water Treatment

In this example, the $MnO_2$ nanofibers synthesized according to Example 1 were evaluated for their efficiencies in oxidizing As(III) to As(V) in comparison with a commercially available product. The comparisons were made using rapid small scale column tests (RSSCTs) under a variety of experimental conditions. Using adsorption isotherm tests, $MnO_2$ nanofibers were also evaluated for their performance in removing As(V) and Pb(II) from drinking water.

For all evaluation experiments, a so-called "challenge water" of the composition described in Table 2 was used. It has the same anionic composition as the National Sanitation Foundation (NSF) International Standard 53 Challenge Water used for evaluation of point-of-use devices for arsenic removal. Its calcium and magnesium concentrations were lowered to give the water greater long-term stability, as the NSF water is stable only for about 24 to about 48 hours, whereas the isotherm tests described herein were conducted for greater than or equal to about 48 hours. The following reagent grade salts were used to prepare the challenge water: $NaNO_3$, $NaHCO_3$, $Na_2HPO_4 \cdot H_2O$, NaF, $Na_2SiO_3 \cdot 9H_2O$, $MgSO_4 \cdot 7H_2O$, and $CaCl_2 \cdot 2H_2O$. Interfering $Fe^{2+}$ ions in As(III) oxidation tests were introduced from ferrous ammonium sulfate (EM Science). $Mn^{2+}$ and $S^{2-}$ were prepared from $MnSO_4 \cdot H_2O$, and $Na_2S \cdot 9H_2O$, respectively.

TABLE 1

Composition of the Challenge Water

| Cations | meq/L | mg/L | Anions | meq/L | mg/L |
|---|---|---|---|---|---|
| $Na^+$ | 3.604 | 82.9 | $HCO_3^-$ | 2.0 | 122.0 |
| $Ca^{2+}$ | 0.36 | 7.21 | $SO_4^{2-}$ | 1.0 | 48.0 |
| $Mg^{2+}$ | 0.26 | 3.16 | $Cl^-$ | 0.36 | 12.8 |
| | | | $NO_3^-$—N | 0.143 | 2.0 |
| | | | $F^-$ | 0.053 | 1.0 |
| | | | $PO_4^{3-}$—P | 0.0013 | 0.04 |
| | | | Silicate as $SiO_2$ | 0.66 | 20.0 |
| Total | 4.224 | 93.27 | | 4.224 | 205.8 |

Estimated total dissolved solids (TDS) by evaporation = 287 mg/L.
meq/L = milliequivalents per liter
mg/L = milligrams per liter Both low and high levels of dissolved oxygen (DO) were used in the challenge water during As(III) oxidation tests. Low-DO, i.e., less than about 80 parts per billion (ppb) $O_2$, challenge water was prepared by sparging the challenge water with $N_2$ for 1.5 hours. High-DO challenge water was prepared by sparging water with air for 15 minutes to a dissolved oxygen saturation concentration of approximately 8.3 mg/L. As(III) was spiked into the challenge water, and then freshly prepared $Fe^{2+}$, $Mn^{2+}$ or $S^{2-}$ solutions were spiked. During the experiments, the pH of the challenge water was adjusted to a range of about 6.5 to 8.5 by using dilute HCl and NaOH solutions.

For the As(III) oxidation tests, rapid small scale column tests (RSSCTs) were used to evaluate $MnO_2$ nanofibers for their efficiency in oxidizing As(III) to As(V). The tests were conducted under a variety of experimental conditions including variable pH, empty bed contact time (EBCT), low/high dissolved oxygen (DO), and the absence or presence of interfering reductants ($Fe^{2+}$, $Mn^{2+}$, or $S^{2-}$).

It is noted here that MnO$_2$ nanofibers were not directly used in the column test, because of their small particle size (about 10 μm) which would have given an extremely high pressure drop in a packed bed. To achieve reasonable RSSCT flow rates, the MnO$_2$ nanofibers were granulized by the spray-drying technique described in Example 1 to form larger, but porous particles. Granulized, porous MnO$_2$ particles (having diameters of about 125 to about 180 μm) were loaded into a 1 centimeter inner diameter glass column with total volume of 1.0 mL. The column was then backwashed with deionized water to remove fines.

The As(III) oxidation tests were conducted by pumping the Low-DO challenge water containing As(III) through the column at a controlled flow rate. To speciate the effluent, 10-mL samples of the effluent from the RSSCT were collected and preserved with EDTA-HAc. As(III) concentration in the effluent was analyzed by hydride-generation atomic absorption spectrophotometry (HG-AAS).

For the As(V) and Pb(II) adsorption isotherm tests, a 2-day wet-slurry isotherm procedure was used for adsorption isotherm tests. First, adsorbents were screened with a set of 200 and 325 mesh sieves. Powder that was trapped between these two sieves, i.e., having a particle size between about 45 to about 75 μm, was used to make a suspension with a powder content of 1.00 g/L. The suspension was vigorously stirred to keep powders suspended. Predetermined aliquots of the vigorously stirred suspension were pipetted into 150-mL bottles to yield appropriate adsorbent concentrations for the equilibrium adsorption tests. Then, 100-mL aliquots of As(V) or Pb(II) spiked synthetic water was added to each bottle. Adsorbent media dosages that were tested were: 0, 0.25, 0.5, 1, 2, and 5 mg MnO$_2$ in every 100 mL As(V) or Pb(II) spiked synthetic water. The dosed bottles and the blank (no adsorbent) were placed in a covered wooden box and rotated at 15 revolutions per minute (rpm) for 2 days at ambient temperature (about 23° C.) to reach adsorption equilibration. It was determined that a reasonable approach to equilibrium was reached in 48 hours. After the equilibration, a 10-mL water sample was collected from each bottle and microfiltered with a 0.2 μm filter disc to remove all suspended particles (adsorbent media). The water samples were preserved with concentrated HNO$_3$ prior to analysis. The acid concentration in the water sample was about 1% (v/v). For As(V) adsorption isotherm tests, the challenge water was spiked with 200 μg/L As(V). Arsenic concentrations in the preserved water samples were also measured by HGAAS. The mass of arsenic adsorbed onto the media was determined from the difference in soluble arsenic concentrations in the equilibrated samples and the blank (no adsorbent). For Pb(II) adsorption isotherm tests, the challenge water was spiked with 500 μg/L Pb(II), and the Pb(II) concentrations in the preserved water samples were measured by inductively coupled plasma mass spectrometry (ICP-MS). The mass of lead adsorbed onto the media was determined from the difference in soluble lead concentrations in the equilibrated samples and the blank (no adsorbent).

The arsenic analysis was performed using a Perkin-Elmer (Model Zeeman 5000) atomic absorption spectrometer (AAS) coupled with a Perkin-Elmer FIAS-100 unit for hydride generation for the determinations of As(III) and As(total). The arsenic lamp was an electrodeless discharge lamp (EDL) operated at 8 W from an external power supply. To determine total arsenic, water samples were treated with L-cysteine in a 2 moles per liter (M) HCl solution to reduce As(V) to As(III) which was determined by the HGAAS. For the determination of As(III) in the presence of As(V), the carrier HCl solution was replaced by a 2 M citric/citrate buffer solution at a pH of about 5.0. Arsine was generated using 0.2% sodium tetrahydroborate in 0.05% NaOH. Under these condition As(V) was not converted to AsH$_3$ and did not interfere in the determination of As(III). As(V) was calculated from the difference between As(total) and As(III). The detection limit (DL) was 0.04 μg/L for As(total) and 0.096 μg/L for As(III).

Short-term As(III) oxidation tests at high-DO were conducted to compare the efficiency of a commercially available MnO$_2$, FILOX-R, with nanoporous MnO$_2$ in oxidizing As(III) to As(V) at three different EBCTs (2.0, 1.0, and 0.50 minutes) and at two pHs (8.3 and 6.5). Both FILOX-R and naofibrous MnO$_2$ granules completely oxidize As(III) to As(V). No distinguishable performance was observed under these test conditions.

In the short-term, low-DO experiments, the EBCT was further reduced to about 0.125 minutes to differentiate the oxidizing efficiencies of both media. Table 3 compares the performances of FILOX-R and granulated nanofibrous MnO2 media at different EBCTs for low-DO challenge water without any interfering reductant at pH 8.3 and 7.5. Up to about 0.25 minutes EBCT there was no significant difference in oxidation performance between the two media. But there was a clear difference in the As(III) oxidation rate at an EBCT of 0.125 minutes. Granulated nanofibrous MnO2 media was more effective than FILOX-R for rapid oxidation of As(III) to As(V). At higher pH both media showed better performance than at lower pH; at both pHs the oxidizing efficiency of granulated nonofibrous MnO2 media was better than FILOX-R.

Based on the short-term experiments at low and high-DO, it could be concluded that DO had no significant effect on oxidizing efficiency up to EBCT 0.5 minutes for both media.

TABLE 3

As(III) oxidation performance of FILOX-R and Inframat media at low-DO without any interfering reductants

| Challenge | | Percent oxidation of As(III) | |
|---|---|---|---|
| Water pH | EBCT | FILOX-R | MnO$_2$ Granules |
| pH 8.3 | 0.5 | 100 | 100 |
| | 0.25 | 98 | 100 |
| | 0.125 | 79 | 94 |
| pH 7.5 | 0.125 | 71 | 75 |

Long term experiments with interfering reductants were carried out. To study the effects of the interfering reductants, except sulfide, on the oxidation performance, a run length of more than 2100 bed volumes (BV) was considered. In the presence of sulfide, arsenic sulfides along with many water-soluble thioarsenite species are formed, and accurate differentiation between As(III) and As(V) cannot be made. The availability of the free As(III) decreased with time. So, in the presence of sulfide, only short-term experiments were conducted to observe the effects of sulfide on oxidizing efficiency of the granulated nanoporous material and FILOX-R.

Figure 6:
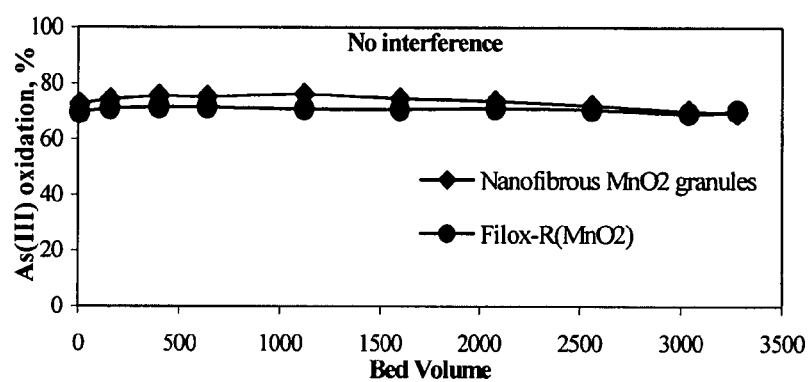
FIG. 6 graphically illustrates the As(III) oxidation in low dissolved oxygen challenge water at a pH of about 7.5 without any interfering reductants.

In the absence of interfering reductants, the results of the longer-term oxidation performances of nanofibrous MnO$_2$ granules and FILOX-R are shown in FIG. 6. The tests were performed at an EBCT of about 0.125 minutes, low-DO, and at pH 7.5. As(III) oxidation was greater than or equal to about 70% throughout the 3280 BV run length with when nanofibrous MnO$_2$ granules were used. As a reference, about 3500 BV is approximately equivalent to about 438 minutes run time.

As can be seen in FIG. 6, the FILOX-R had a slightly lower oxidizing efficiency than the nanofibrous $MnO_2$ granules under the same experimental conditions. Therefore, in the absence of any interfering reductant, both media can effectively oxidize As(III) under low-DO condition, however, the nanofibrous $MnO_2$ granules showed slightly better oxidative performance FILOX-R.

Figure 7:
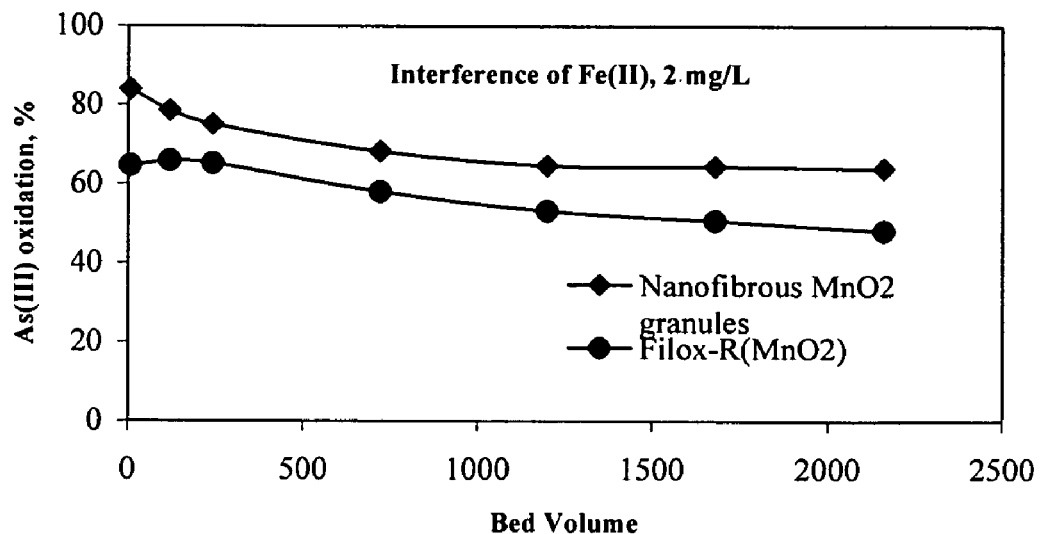
FIG. 7 graphically illustrates the As(III) oxidation in low dissolved oxygen challenge water at a pH of about 7.5 with Fe(II) as an interfering reductant.

When 2.0 mg/L Fe(II), as an interfering reductant, was present in the feed, As(III) oxidation was reduced for a short period of time for nanofibrous $MnO_2$ granules, and then the efficiency decreased slowly to about 1200 BV. After about 1200 BV, the oxidative ability was substantially constant. With FILOX-R, initially up to about 240 BV, Fe(II) had no effect on As(III) oxidation, but after about 240 BV, the oxidative efficiency decreased gradually up to about 2160 BV. These results, which are shown in FIG. 7 for a pH of about 7.5 and an EBCT of 0.125 minutes, clearly indicated that nanofibrous $MnO_2$ outperformed FILOX-R in the presence of Fe(II).

Figure 8:
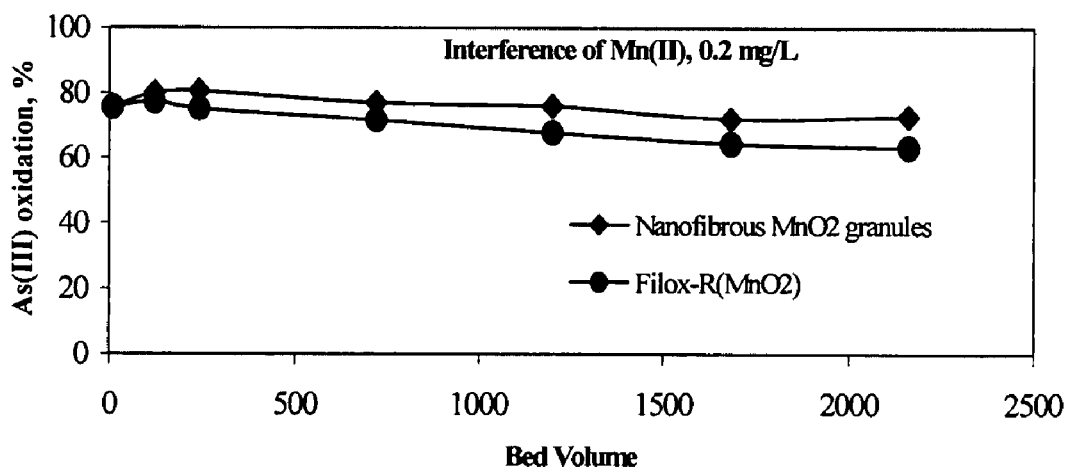
FIG. 8 graphically illustrates the As(III) oxidation in low dissolved oxygen challenge water at a pH of about 7.5 with Mn(II) as an interfering reductant.

The effect of 0.2 mg/L Mn(II) as an interfering reductant on both media's As(III) oxidation efficiency was studied at a pH of about 7.5 and an EBCT of 0.125 minutes, and the results are shown in FIG. 8. As indicated by FIG. 8, initially up to about 120 BV, the oxidation efficiencies of the nanofibrous $MnO_2$ granules and FILOX-R increased slightly and then decreased slightly with increasing BV treated. The experimental results indicate a slight advantage for nanofibrous $MnO_2$ compared with FILOX-R.

When both As(III) and sulfide are present in anoxic water insoluble sulfides and soluble sulfide complexes are formed. It has previously been determined that under anoxic conditions in the presence of sulfide, As(III) forms insoluble $As_2S_3$ and soluble thioarsenite species depending on the pH of the solution and the concentrations of As(III) and $S^2$. Therefore, in waters containing sulfide and As(III), colloidal and anionic forms of As(III) are expected, which render the current As(III)/(V) speciation methods inapplicable. Oxidation of As(III) to As(V) cannot be accurately determined in these waters using the EDTA-HAc preservation speciation method that was used for the As(III) oxidation studies in the absence of sulfide. Thus, the differential-pH hydride generation speciation method was employed to overcome the analytical problem with As(III/V) preservation-speciation in the presence of sulfide.

Figure 9:
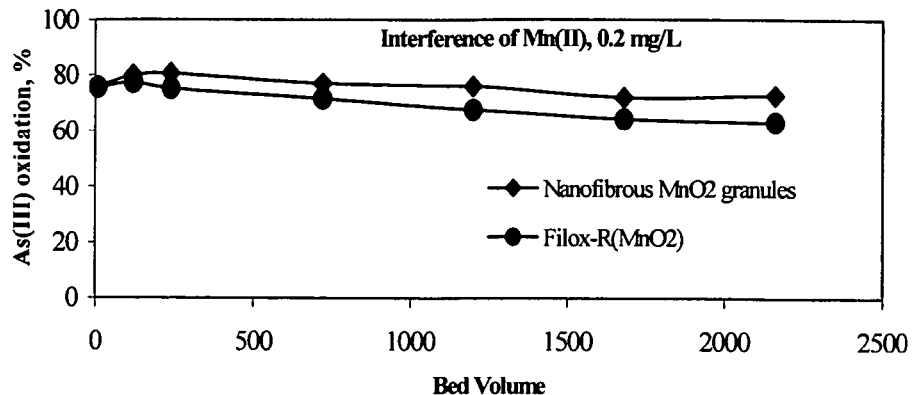
FIG. 9 graphically illustrates the As(III) oxidation in low dissolved oxygen challenge water at a pH of about 7.5 with sulfide as an interfering reductant.

The oxidation efficiencies of the nanoporous $MnO_2$ and FILOX-R were calculated at specified time intervals and compared in FIG. 9 for 2.0 mg/L sulfide, a pH of about 7.5, and an EBCT of about 0.125 minutes. The results indicated that in both cases the oxidation efficiencies decreased with increasing BV. The results also indicated that in the presence of sulfide, FILOX-R slightly outperformed the nanofibrous $MnO_2$ granules.

Figure 10:
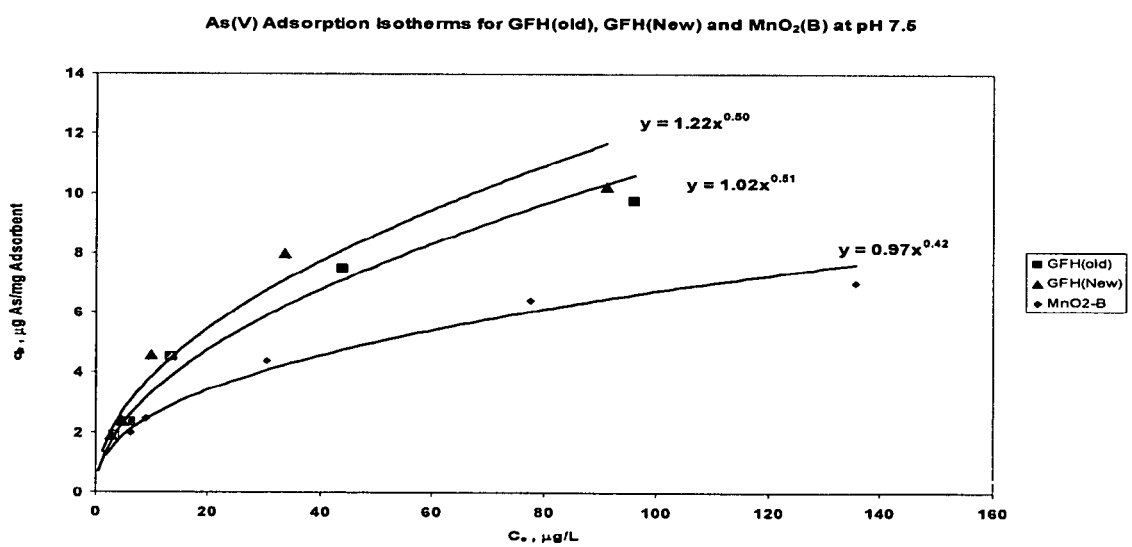
FIG. 10 graphically illustrates adsorption isortherms for As(V)

The ability of $MnO_2$ to adsorb As(V) from the challenge water was evaluated using batch isotherms tests. As(V) adsorption isotherms of $MnO_2$ are shown in FIG. 10 for both the nanoporous $MnO_2$ and a commercially available iron-based arsenic adsorbent, GFH. As can be seen from the data of FIG. 10, more arsenic was removed when a higher dosage of the adsorbent was added, resulting in a lower residual (equilibrium) arsenic concentration. Adsorption capacity was calculated by dividing arsenic concentration difference before and after adsorption equilibrium by the amount of adsorbent added. After developing the isotherms, the data were fitted to the Freundlich equation (2):

$$q_e = KC_e^{1/n}, \text{ where} \tag{2}$$

K=Freundlich constant indicative of adsorption capacity of adsorbent (L/μg)

$C_e$=Equilibrium concentration (μg/L)

$q_e$=Mass of arsenic adsorbed per mass of the adsorbent (mg/g)

n=Experimental constant indicative of adsorption intensity of the adsorbent

The As(V) adsorption capacity of $MnO_2$ is substantial, although not as high as GFH. $MnO_2$ is a good oxidant for As(III) to As(V), but was not expected to have good As(V) adsorption capacity. The unusually high As(V) adsorption capacity that was found for the $MnO_2$ nanofibers is believed to be related to its high surface area.

Figure 11:
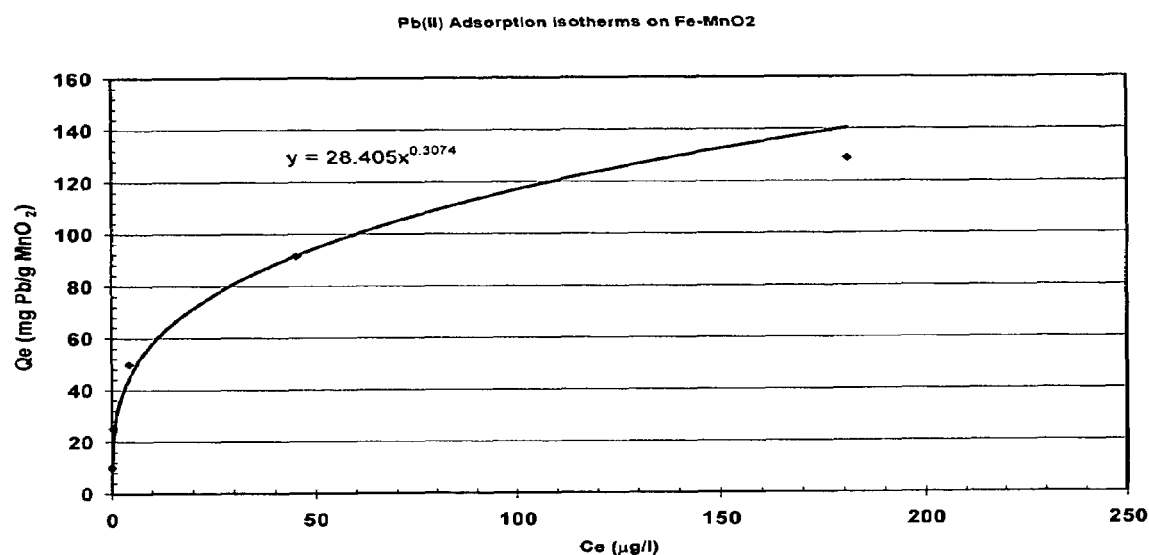
FIG. 11 graphically illustrates an adsorption isortherm for Pb(II)

Finally, the ability of $MnO_2$ to adsorb Pb(II) from the challenge water was evaluated using batch isotherms tests. The Pb(II) adsorption isotherm for nanofibrous $MnO_2$ is shown in FIG. 11. This material possesses a much higher adsorption capacity for Pb(II) (90 μg/g at 50 μg/L Pb(II)) compared with to As(V) (4.5 μg/g at 50 mg/L As(V)). The fact that $MnO_2$-based media adsorbs more Pb(II) than As(V) is expected because of the low point of zero charge (PZC) of $MnO_2$. The PZC of $MnO_2$ is near pH 3.0. When $MnO_2$ is soaked in an aqueous solution, it developed a negatively charged surface which is benefited by adsorbing positively charged species in water, such as Pb(II).

From the experiments in this example, it was concluded that the nanofibrous $MnO_2$ not only possessed a high efficiency in converting As(III) to As(V), but also a relatively high adsorption capacity for As(V) and Pb(II).

EXAMPLE 3

Iron Oxide Synthesis and Characterization $Fe_2O_3$ was synthesized by preheating 100 mL water in a beaker to about 90° C. A 6M NaOH solution and 100 mL of a 2M $Fe(NO_3)_3$ solution were co-precipitated into the hot water while it was continuously heated and stirred. The pH of the precipitate was controlled at about 7.5. The precipitate was continuously refluxed at about 90° C. for 6 hours. The precipitate was then filtered, washed with water, and dried in an oven at about 100° C. The dried material was ground into a powder for further testing.

Figure 12:
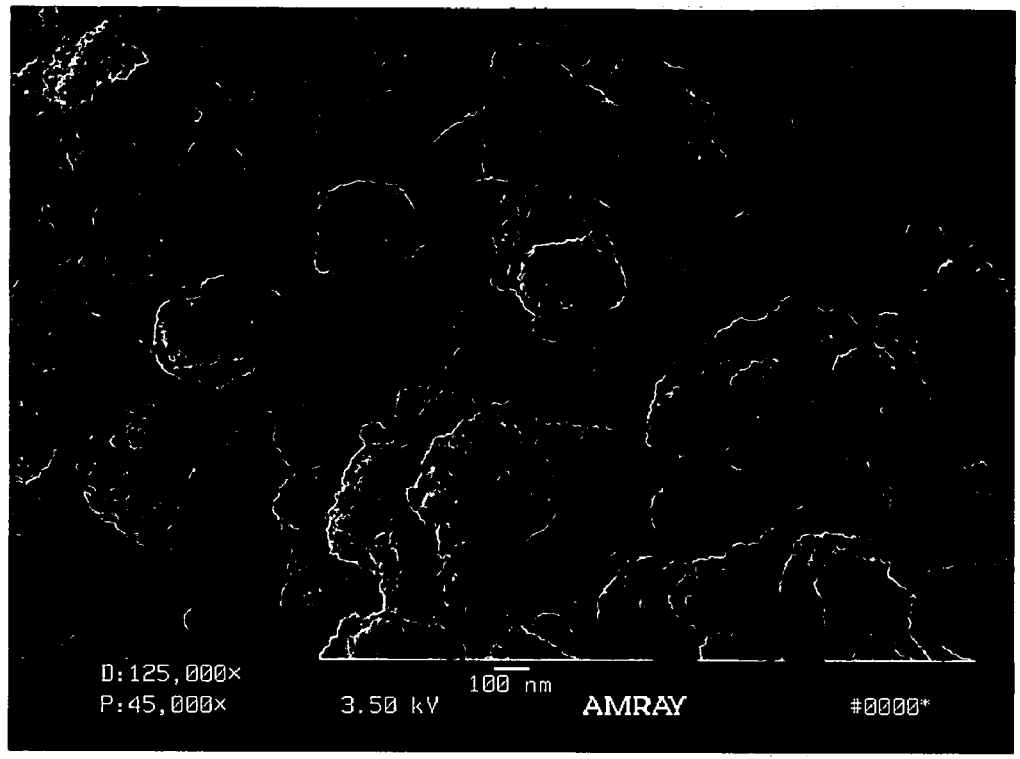
FIG. 12 is a SEM image of a nanostructured $Fe_2O_3$ sample.

The SSA and pore analysis of this material was conducted using BET method as described in Example 1. The SSA of this material was about 154 $m^2/g$ and the total pore volume was about 0.21 $cm^3/g$. XRD analysis revealed that this material possessed the $\alpha$-$Fe_2O_3$ structure. The PZC of this material was at a pH of about 8.4. FIG. 12 is an SEM image, which shows agglomerates of about 100 to about 1000 nm, comprising $Fe_2O_3$ particles having an average size of about 20 nm.

EXAMPLE 4

Doped Iron Oxide and Doped Manganese Oxide Synthesis and Characterization

Figure 13:
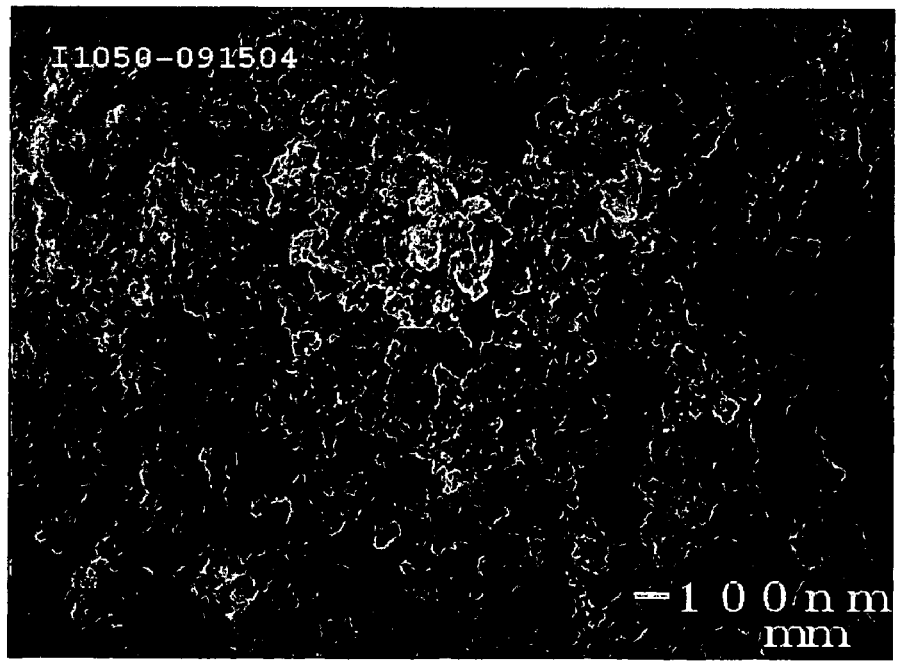
FIG. 13; is a SEM image of a nanostructured Mn-doped $Fe_2O_3$ sample.

A Mn-doped $Fe_2O_3$ was made following the process of Example 3 except that 8.73 g $MnSO_4 \cdot H_2O$ was dissolved into 30 mL water and was mixed with 100 mL of the 2M $Fe(NO_3)_3$ solution before the precipitation was conducted. Doping dramatically changed the material's properties. The SSA of this material was about 259 $m^2/g$ and the total pore volume was about 0.48 $cm^3/g$. XRD analysis revealed that this material had the structure of a ferrihydrate. The PZC of this material was at a pH of about 7.1. FIG. 13 is an SEM image, which shows smaller agglomerates, comprising the Mn-doped Fe$_2$O$_3$ particles having an average size of about 20 nm. The smaller agglomerate size is in agreement with the higher total pore volume.

Figure 14:
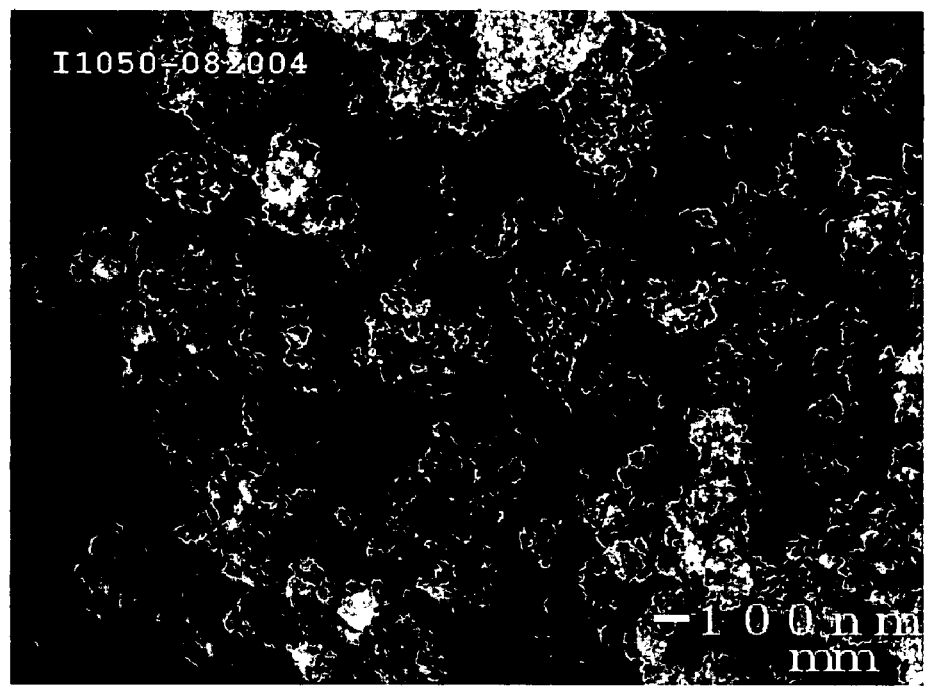
FIG. 14; is a SEM image of a nanostructured La-doped $Fe_2O_3$ sample.

A La-doped Fe$_2$O$_3$ was made following the process of Example 3 except that LaCl$_3$ was dissolved in water and was mixed with 100 mL of the 2M Fe(NO$_3$)$_3$ solution before the precipitation was conducted. The SSA of this material was about 174 m$^2$/g and the total pore volume was about 0.41 cm$^3$/g. XRD analysis revealed that this material had the structure of hematite. The PZC of this material was at a pH of about 8.8. FIG. 13 is an SEM image, which shows smaller agglomerates, comprising Fe$_2$O$_3$ particles having an average size of about 20 nm. FIG. 14 is an SEM image of the La-doped Fe$_2$O$_3$. Similar to the Mn-doped Fe$_2$O$_3$ sample, the agglomerates are significantly smaller than those of the undoped Fe$_2$O$_3$ sample. The average particle size is about 20 nm.

A Fe-doped MnO$_2$ was made following the process of Example 1, with the exception that Fe(NO$_3$)$_3$ was used as a precursor and was added simultaneously into a beaker containing hot water with the MnSO$_4$ and the KMnO$_4$. The SSA of this material was about 503 m$^2$/g and the total pore volume was about 0.44 cm$^3$/g. XRD analysis revealed that doping reduced the crystallinity of the MnO$_2$ structure. The PZC of this material was at a pH greater than 3.0, which is the PZC pH for the undoped MnO$_2$ of Example 1.

EXAMPLE 5

Iron- and Manganese-based Nanocomposite Water Treatment Media

Various composites were prepared using the iron oxides and manganese oxides (both undoped and doped) described herein. The general procedure included dispersing about 1600 g of an iron oxide composition (doped or undoped) in 1 L water. Next, about 400 g of a nanofibrous manganese oxide composition (doped or undoped) were added into the iron oxide suspension and mixed using high power mechanical stirrer. About 2 weight percent (wt %) of a binder was added and mixed. The slurry was spray dried to form nanocomposite granules with a controlled particle size.

RSSCTs were carried out on a variety of samples. The first experiment studied the oxidation and adsorption efficiency of As(III) using composite Fe$_2$O$_3$—MnO$_2$ (Sample No. 072105-B) media at pH 7.5. The second experiment determined the breakthrough of As(V) using Fe$_2$O$_3$—MnO$_2$ (072105-B) media at pHs 6.5, 7.5, and 8.5, and compared them with the As(V) breakthrough of the commercially available benchmark, GFH. The third experiment determined the breakthrough of As(V) using Mn-doped Fe$_2$O$_3$ (072105-A) media at pH 7.5.

For these RSSCTs, a 1 cm inner diameter glass column containing 4 cm$^3$ of the media (60×40 mesh), which was carefully loaded into the column, was used. Similar glass columns were prepared for GFH. A peristaltic pump was used to pump the feed solution through the columns at a flow rate of about 8 mL/min (EBCT of about 0.5 min). Arsenic-containing challenge water was analyzed for total arsenic or As(III) in the effluent and feed solutions. All samples were preserved with concentrated HNO$_3$ (1 mL/L) or EDTA-acetic acid (1.34 mM EDTA and 87 mM acetic acid) when speciated. RSSCTs were conducted at different pHs using As(V) and As(III). Table 4 presents the experimental conditions for the RSSCTs.

TABLE 4

Experimental conditions for RSSCTs for arsenic.

| Expt. no | pH | As in feed soln | EBCT (min) | Media |
|---|---|---|---|---|
| 1 | 7.5 | As(III) | 0.5 | Fe$_2$O$_3$—MnO$_2$ (072105-B) |
| 2 | 6.5 | As(V) | 0.5 | Fe$_2$O$_3$—MnO$_2$ (072105-B) and GFH |
| 3 | 7.5 | As(V) | 0.5 | Fe$_2$O$_3$—MnO$_2$ (072105-B) and GFH |
| 4 | 8.5 | As(V) | 0.5 | Fe$_2$O$_3$—MnO$_2$ (072105-B) and GFH |
| 5 | 6.5 | As(V) | 0.5 | GFH |
| 6 | 7.5 | As(V) | 0.5 | GFH |
| 7 | 8.5 | As(V) | 0.5 | GFH |
| 8 | 7.5 | As(V) | 0.5 | Fe$_2$O$_3$ (072105-A) |

Figure 16:
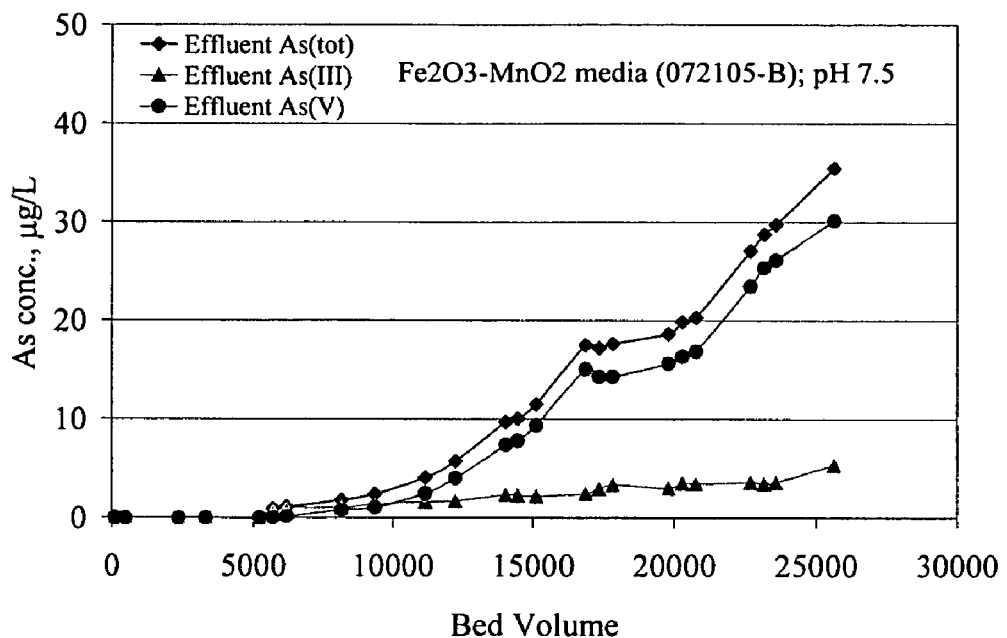
FIG. 16 graphically illustrates the breakthrough curves of total arsenic, As(III), and As(V) using a composite $Fe_2O_3$—$MnO_2$ media at a pH of about 7.5.

RSSCTs were conducted to study the oxidation of As(III) and adsorption of arsenic using the composite Fe$_2$O$_3$—MnO$_2$ (072105-B) media at a pH of about 7.5 at an EBCT of about 0.5 minutes. The arsenic breakthrough curves of the RSSCTs are shown in FIG. 16, which indicates that at pH 7.5, the composite material significantly oxidized As(III). As(III) concentrations in the effluent were measured after preservation with EDTA-HAc followed by differential pH HG-AAS. At about 25,000 BV the concentration of As(III) in the effluent was about 5 μg/L. As(Tot) and As(V), that is, the difference between As(Tot) and As(III), were also measured in the effluent. The As(Tot) and As(V) breakthroughs at 10 μg/L using the composite Fe$_2$O$_3$—MnO$_2$ media at a pH of about 7.5 were about 14500 and about 15300 BV, respectively. From this study, it was concluded that the composite Fe$_2$O$_3$—MnO$_2$ media was very efficient for As(III) oxidation and As(V) adsorption. In Example 2, it was shown that the MnO$_2$ media efficiently oxidized As(III). This composite material contained the MnO$_2$ of Example 2, which efficiently oxidized As(III), and Fe$_2$O$_3$, which efficiently adsorbed As(V).

Figure 15:
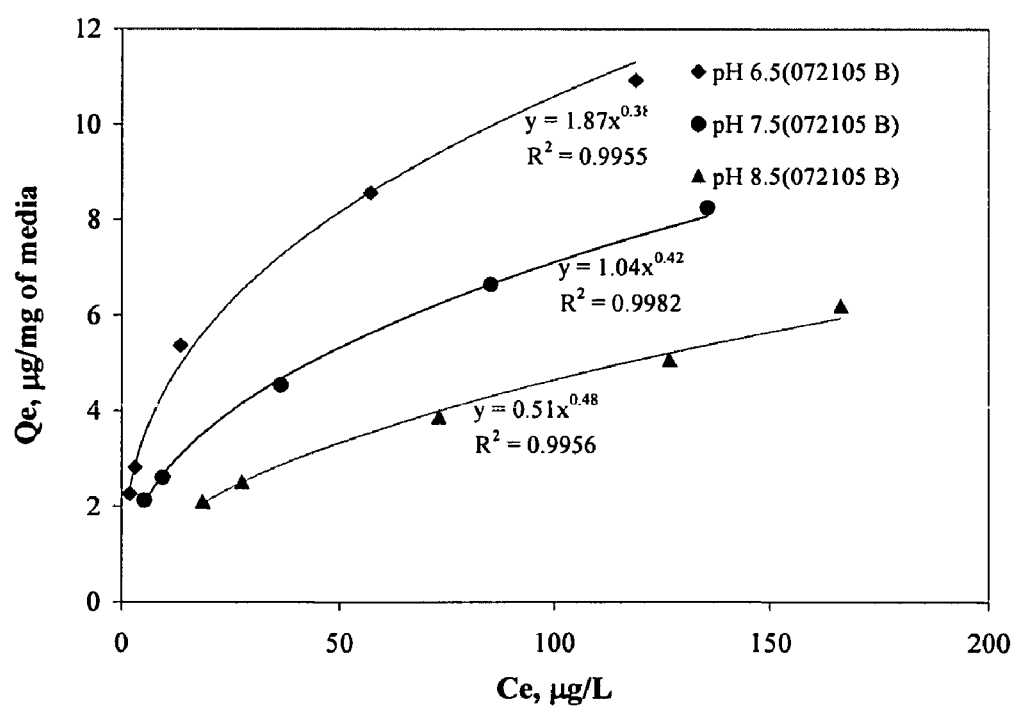
FIG. 15 graphically illustrates As(V) adsorption isortherms for a composite $Fe_2O_3$—$MnO_2$ media at various pH.
Figure 17:
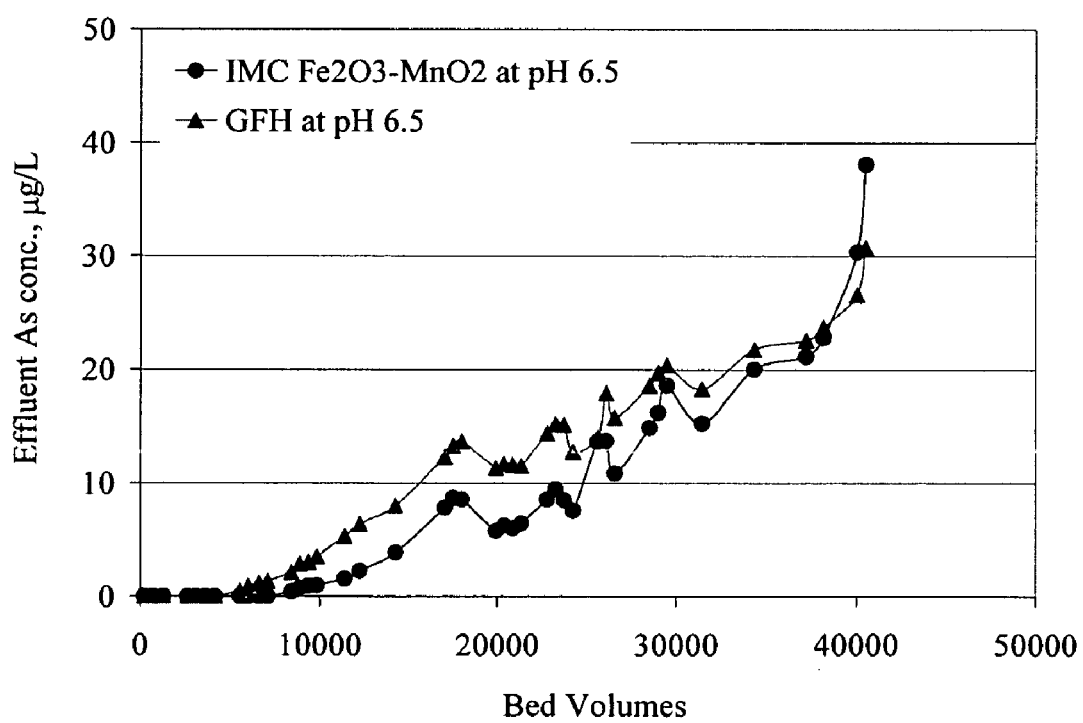
FIG. 17 graphically illustrates the breakthrough curves of As(V) for a composite $Fe_2O_3$—$MnO_2$ media and GFH at a pH of about 6.5.
Figure 18:
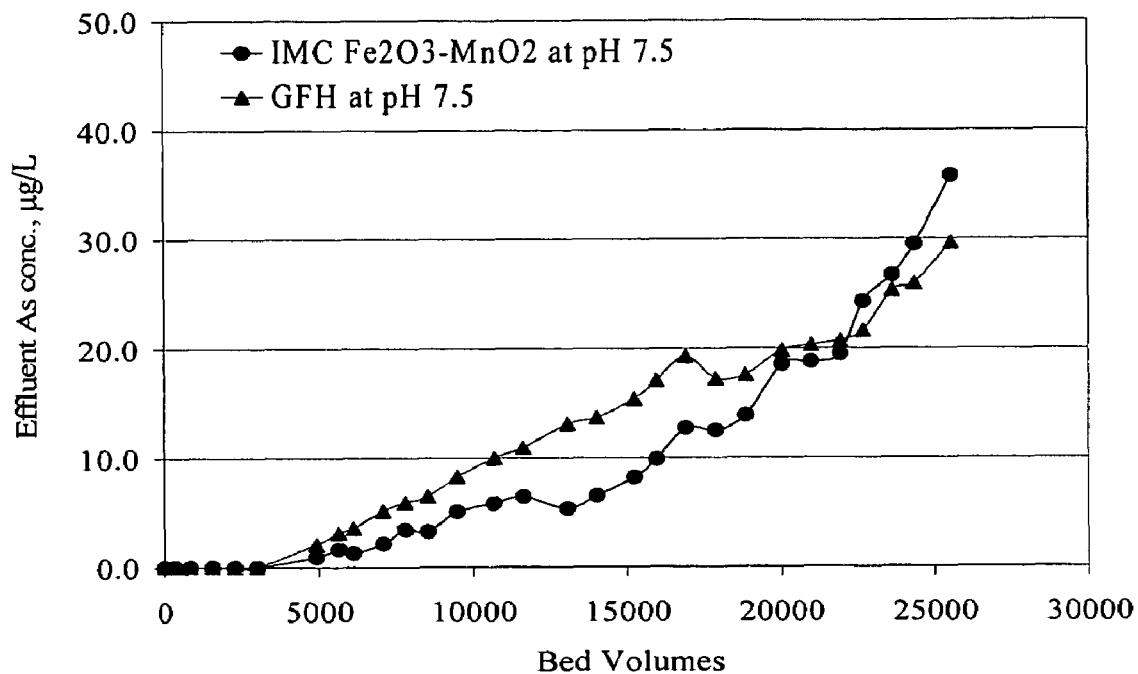
FIG. 18 graphically illustrates the breakthrough curves of As(V) for a composite $Fe_2O_3$—$MnO_2$ media and GFH at a pH of about 7.5.
Figure 19:
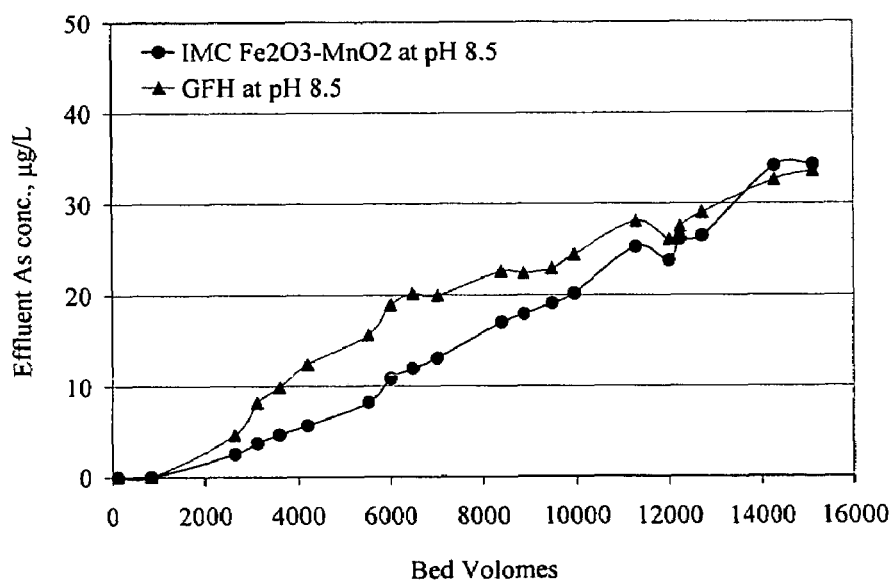
FIG. 19 graphically illustrates the breakthrough curves of As(V) for a composite $Fe_2O_3$—$MnO_2$ media and GFH at a pH of about 8.5.

Next, RSSCTs were conducted using composite Fe$_2$O$_3$—MnO$_2$ (072105-B) media and GFH at three different pHs at an EBCT of 0.5 min (Experiments 2-7 in Table 4). Fifty parts per billion (μg/L) As(V) was used in all experiments to evaluate the effectiveness of the composite media and the GFH. The As(V) adsorption isotherms for the composite Fe$_2$O$_3$—MnO$_2$ (072105-B) media at pHs of about 6.5, about 7.5, and about 8.5 are shown in FIG. 15. The arsenic breakthrough curves of the column runs are shown in FIGS. 17, 18, and 19, for pHs of about 6.5, about 7.5, and about 8.5, respectively. The data indicated that the arsenic breakthrough curves were pH dependent, and at all three pHs, the composite Fe$_2$O$_3$—MnO$_2$ material significantly outperformed the GFH at 10 μg/L As(V) breakthrough. At a pH of about 6.5, both media performed better than at the higher pHs. The As(V) breakthroughs at pHs of about 6.5, about 7.5, and about 8.5 for the composite Fe$_2$O$_3$—MnO$_2$ media were about 25300, about 16200, and about 9900 BV, respectively. In contrast, for GFH, the As(V) breakthrough values at 10 μg/L were about 15800, about 10800, and about 6400 BV, respectively. From this data, it was concluded that the composite Fe$_2$O$_3$—MnO$_2$ (072105-B) media performed significantly better than the commercially available GFH media.

Figure 20:
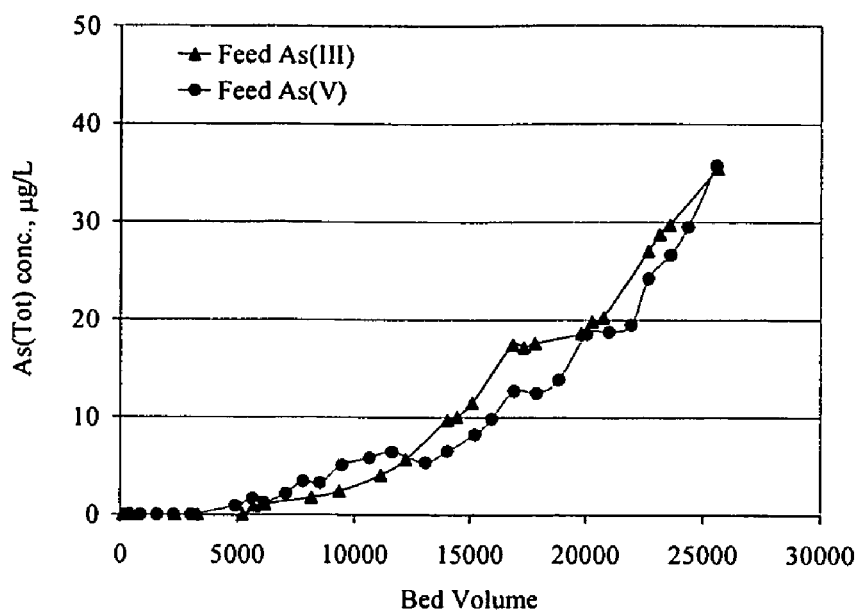
FIG. 20 graphically illustrates the breakthrough curves of As(III) and As(V) for a composite $Fe_2O_3$—$MnO_2$ media at a pH of about 7.5.

It has been documented that As(V) is more efficiently removed than As(III). Thus, it is important to compare the arsenic removal efficiency of the composite Fe$_2$O$_3$—MnO$_2$ (072105-B) media for a pure As(V) feed compared with a pure As(III) feed. FIG. 20 illustrates the breakthrough curves at a pH of about 7.5 with an EBCT of about 0.5 minutes for both As(III) and As(V). FIG. 11 indicates that the composite material was almost equally efficient in removing As(III) and As(V). This means that when pure As(III) was fed into the column, the composite $Fe_2O_3$—$MnO_2$ media was doing an excellent job of oxidizing As(III) to As(V) prior to adsorption of the As(V). An advantageous feature of the composite media was that there was no need for a pre-oxidation step when arsenic was present as As(III) in the water. Advantageously, this will result in a reduction in the amount of byproducts that are generated during the pretreatment process.

Figure 21:
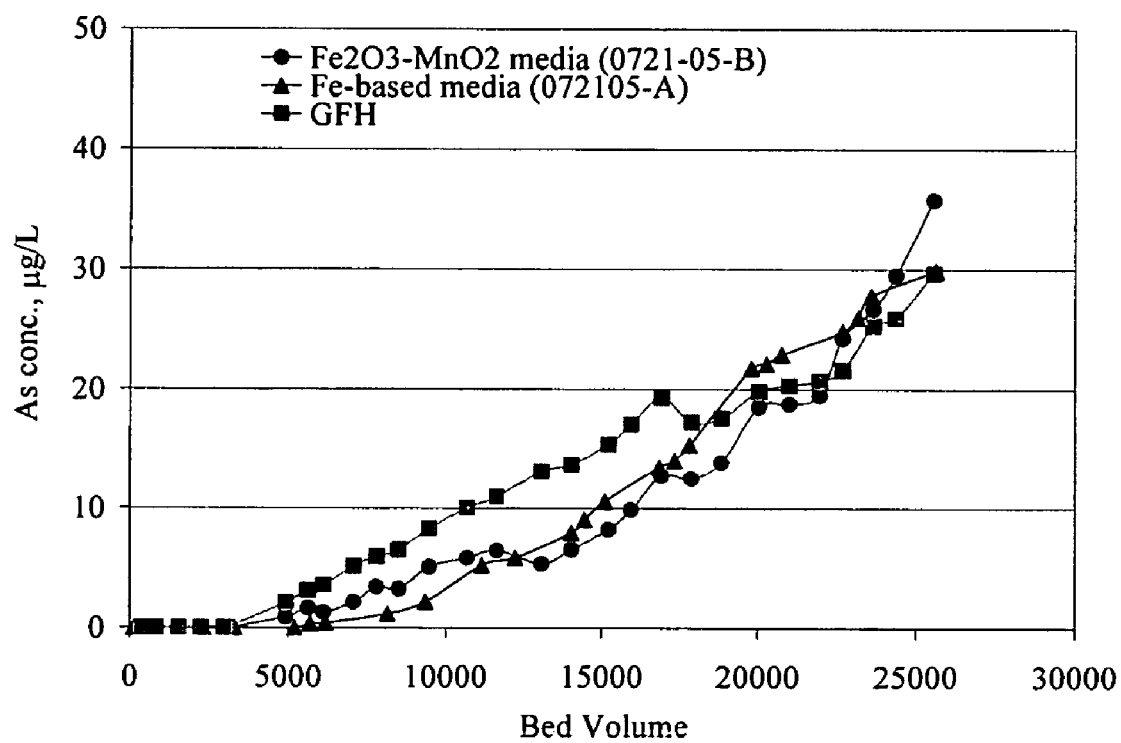
FIG. 21 graphically illustrates the breakthrough curves of As(V) for a composite $Fe_2O_3$—$MnO_2$ media, $Fe_2O_3$, and GFH at a pH of about 7.5.

The Fe-based media produced in Examples 3 and 4 were also used to study the removal efficiency of arsenic. RSSCTs were conducted using an Fe-based media (072105-A) at a pH of about 7.5 at an EBCT of about 0.5 minutes and compared with the composite $Fe_2O_3$—$MnO_2$ media (070521-B) and GFH. The results are shown in FIG. 21, which indicate that Fe-based media (072105-A) alone performed significantly better than the GFH. Furthermore, the Fe-based media alone also performed similar to the composite $Fe_2O_3$—$MnO_2$ media (070521-B).

Figure 22:
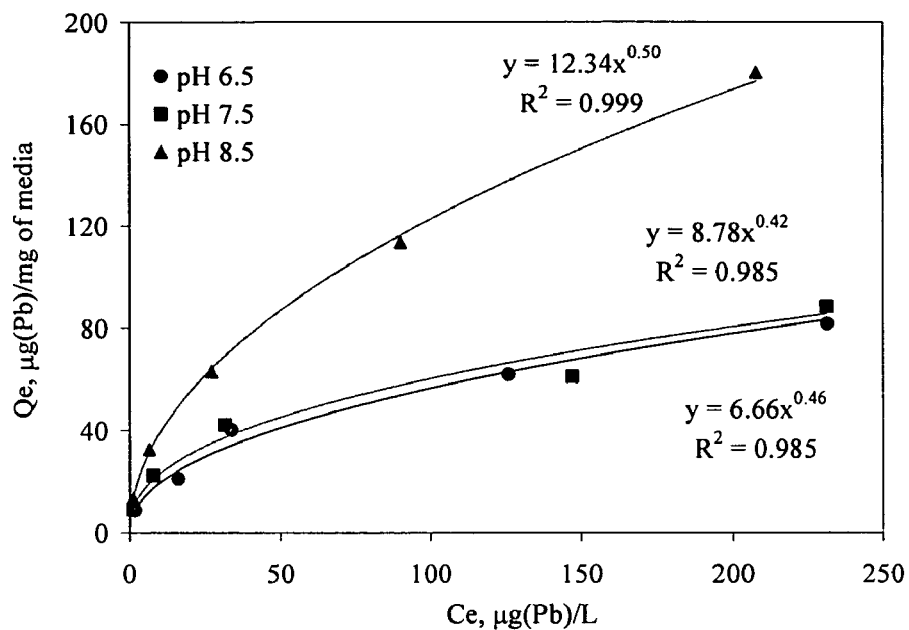
FIG. 22 graphically illustrates Pb(II) adsorption isotherms for a composite $Fe_2O_3$—$MnO_2$ media at various pH.
Figure 23:
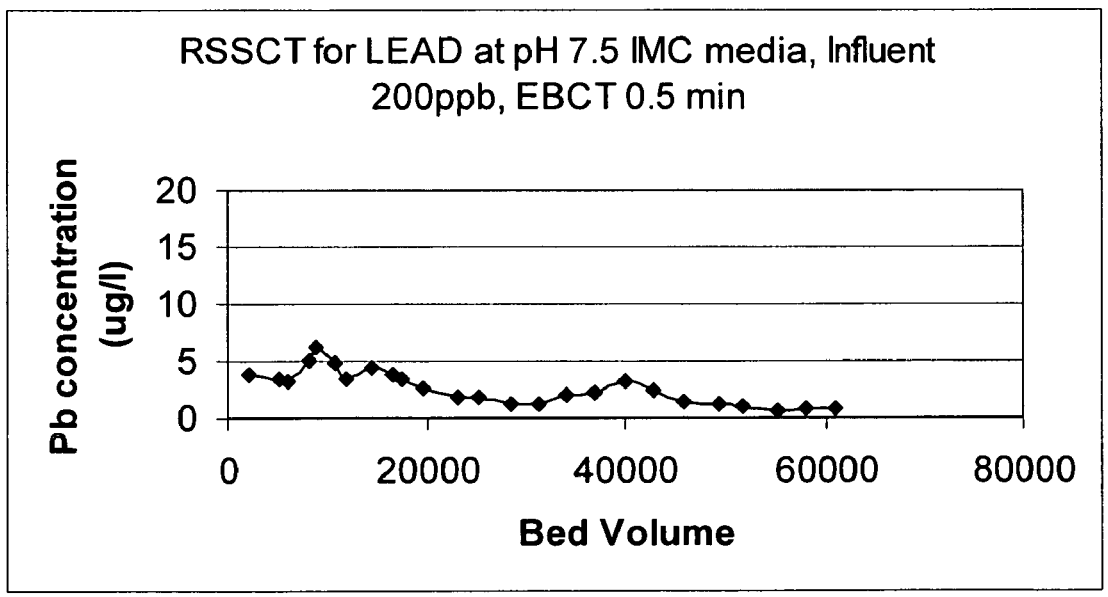
FIG. 23 graphically illustrates the breakthrough curve of Pb(II) for a composite $Fe_2O_3$—$MnO_2$ media at a pH of about 7.5.

Finally, Pb(II) absorption isotherms and breakthrough curves were obtained for the composite $Fe_2O_3$—$MnO_2$ media. 500 µg/L $Pb^{2+}$ spiked NSF 53 challenge water was used. The 2-day isotherms at pHs of about 6.5, about 7.5, and about 8.5 are shown in FIG. 22. The data indicates that the media possess high Pb(II) adsorption capacities. The maximum adsorption capacity was obtained at a pH of about 8.5 and the minimum was at a pH of about 6.5. pH-dependant adsorption of Pb(II) was expected because Pb(II) is a cationic species in water and it can exchange for protons on the surface of the media. The breakthrough of Pb(II) using the composite $Fe_2O_3$—$MnO_2$ (072105-B) media at a pH of about 7.5 was conducted with 200 ppb Pb(II) spiked NSF 53 challenge water. The results are shown in FIG. 23. No sign of breakthrough was shown even after about 60,000 BV run length, indicating that this media was highly effective in removing Pb(II) from water.

EXAMPLE 6

Zirconium Hydroxide and Titanium Hydroxide Synthesis and Characterization

Zirconium hydroxide, titanium hydroxide, and their doped forms were synthesized via co-precipitation of appropriate salt precursors with caustic solution similar to what was described above in Examples 1, 3 and 4. The salts used for the synthesis of zirconium hydroxide and titanium hydroxide were $ZrOCl_2$ and $TiOSO_4$, respectively. Dopants were introduced from corresponding salt precursors that were homogeneously mixed with $ZrOCl_2$ or $TiOSO_4$ solutions. To achieve steady and controllable reaction conditions, the precursors were added simultaneously into vigorously stirred water. The flow rates of both solutions were adjusted so that the pH of the produced hydroxide slurry was at a target value throughout the reaction. The hydroxides were then filtered and washed thoroughly with deionized water to remove unwanted byproducts, and finally dried overnight in an oven at 120° C.

The SSA and total pore volume data for zirconium hydroxide, titanium hydroxide, and their doped forms are listed in Table 5. Doped hydroxides exhibited a significantly higher surface area than their undoped counterparts. Titanium-based media exhibited a significantly greater SSA than the zirconium-based media. The total pore volume of titanium-based materials was also higher than that of zirconium-based materials, which suggested that titanium-based media were more porous than zirconium-based media.

TABLE 5

BET, SSA, and Pore Analysis Results

| Sample ID. | Material Description | SSA ($m^2/g$) | Pore Volume ($cm^3/g$) | Micropore Volume ($cm^3/g$) | Surface Area From Micropores ($m^2/g$) |
|---|---|---|---|---|---|
| I-1052-050304 | Zirconium hydroxide | 71 | 0.06 | 0.02 | 47 |
| I-1052-92804 | Mn-doped zirconium hydroxide | 197 | 0.20 | 0.06 | 92 |
| 120904 | Fe-doped zirconium hydroxide | 197 | 0.16 | 0.06 | 130 |
| I-1052-80504 | Titanium hydroxide | 306 | 0.19 | 0.12 | 238 |
| I-1052-092404A | Mn-doped titanium hydroxide | 447 | 0.47 | 0.1 | 178 |
| 120204A | Fe-doped titanium hydroxide | 370 | 0.36 | 0.04 | 76 |

The data revealed that undoped $Ti(OH)_4$ possesses a considerable amount of micropores (greater than about 60%), which contribute approximately 78% of its total surface area. Doping with manganese significantly increased total pore volume of $Ti(OH)_4$, while the micropore volume decreased slightly from about 0.12 $cm^3/g$ to about 0.10 $cm^3/g$. This suggested that the doping created a significant amount of mesopores, resulting in a higher SSA. Compared to $Ti(OH)_4$, $Zr(OH)_4$ is less porous; but, like $Ti(OH)_4$, the porosity is significantly increased when doped. To summarize, doping has shown to be effective in increasing pore volume of these materials.

The PZCs of zirconium hydroxide and titanium hydroxide powders were found to be at pHs of about 8.08 and about 8.15, respectively. Doping with Mn slightly increased the PZCs of these materials to pHs of about 8.50 and about 8.24, respectively. When these materials were in contact with aqueous solutions that had pHs lower than their PZC, the surfaces of these materials developed a positive charge and encouraged the adsorption of negatively charged species in water, such as $H_2AsO_4^-$, $HAsO_4^{2-}$, and $AsO_4^{3-}$. The pH of drinking water is around 7.5. Thus, these two materials are expected to be able to quickly adsorb $H_2AsO_4^-$, and $HAsO_4^{2-}$ from drinking water.

Figure 24:
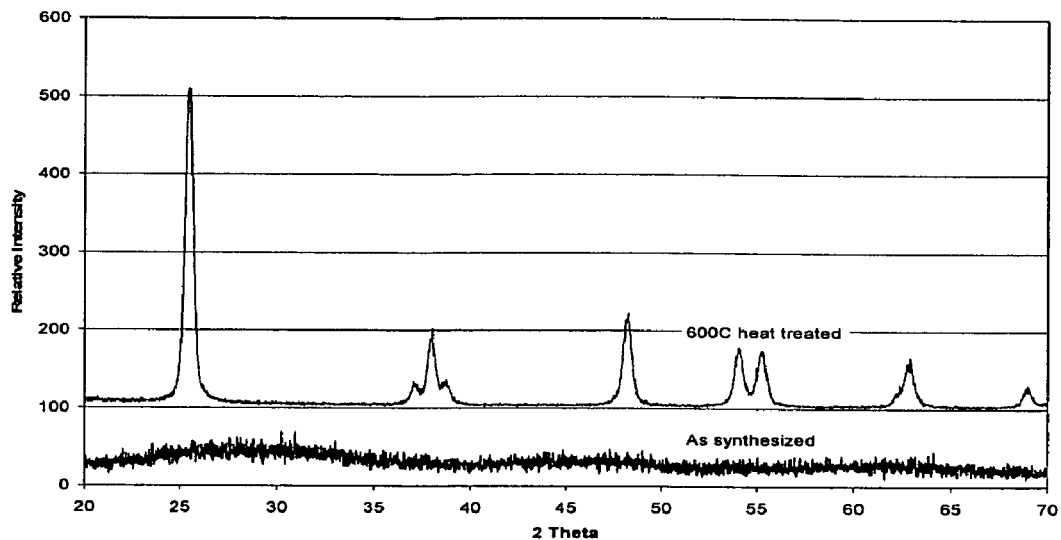
FIG. 24 illustrates powder X-ray diffraction patterns for an as-synthesized samples of $Ti(OH)_4$ and a heat treated sample of $Ti(OH)_4$.
Figure 25:
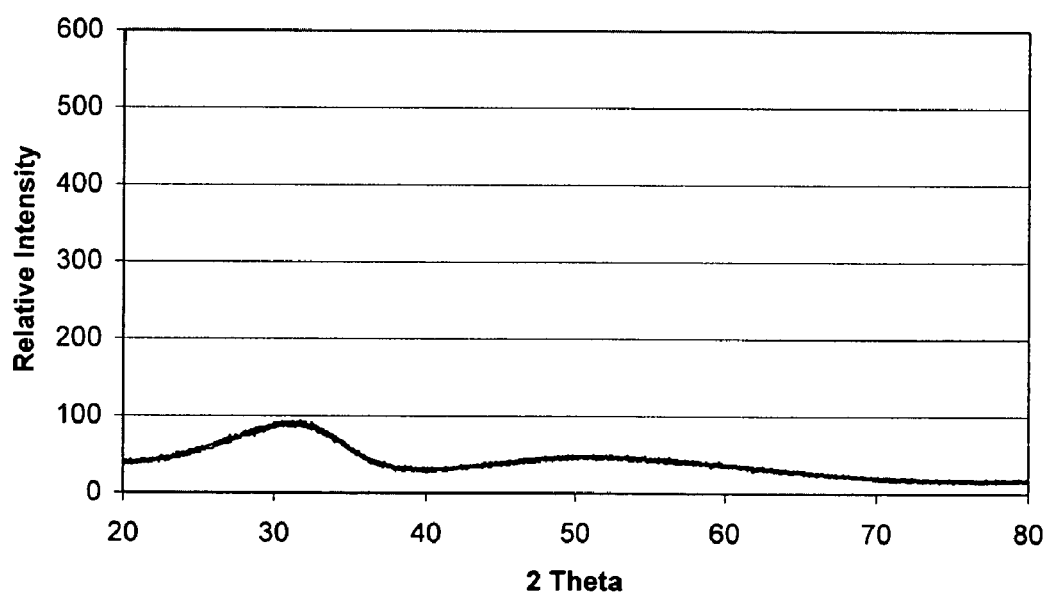
FIG. 25 illustrates a powder X-ray diffraction pattern for an as-synthesized samples of $Zr(OH)_4$.

XRD analysis on these samples revealed that the as-synthesized titanium hydroxide is amorphous, but transforms into the anatase structure type of $TiO_2$ after a 600° C. heat treatment for about 2 hours. The powder XRD patterns are shown in FIG. 24. Similarly, the as-synthesized zirconium hydroxide is amorphous, as shown in the XRD pattern in FIG. 25.

Figure 26:
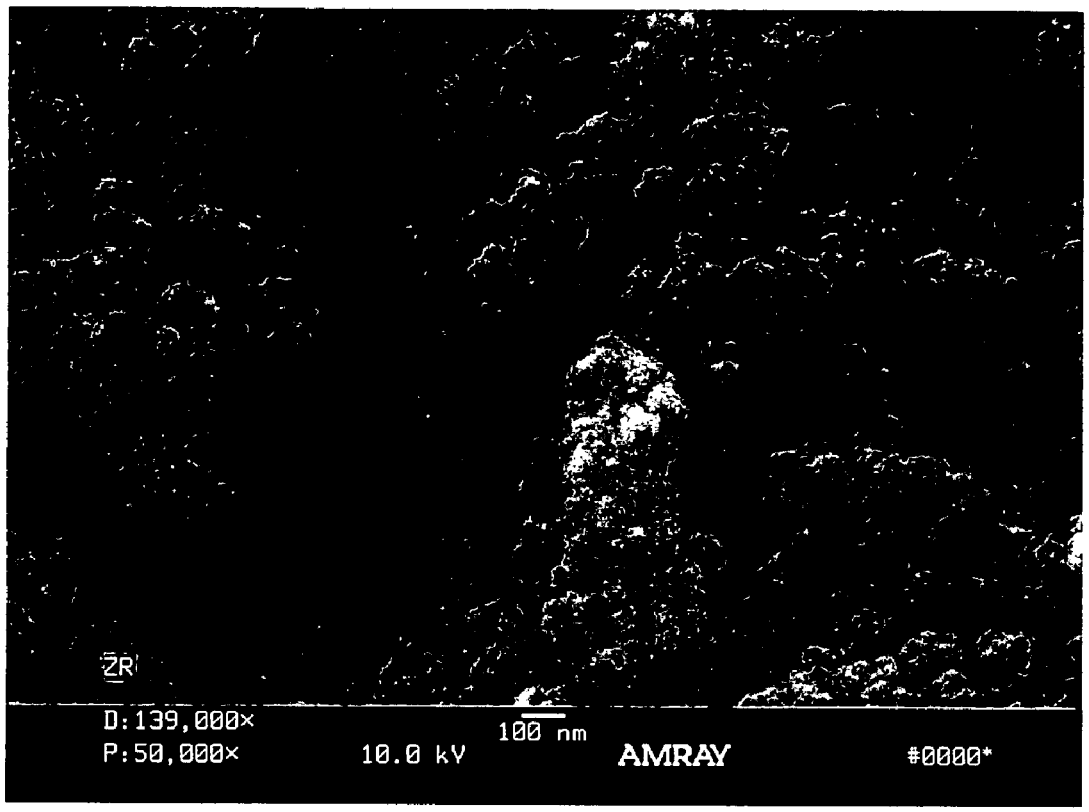
FIG. 26 is a SEM image of a nanostructured $Zr(OH)_4$ sample.
Figure 27:
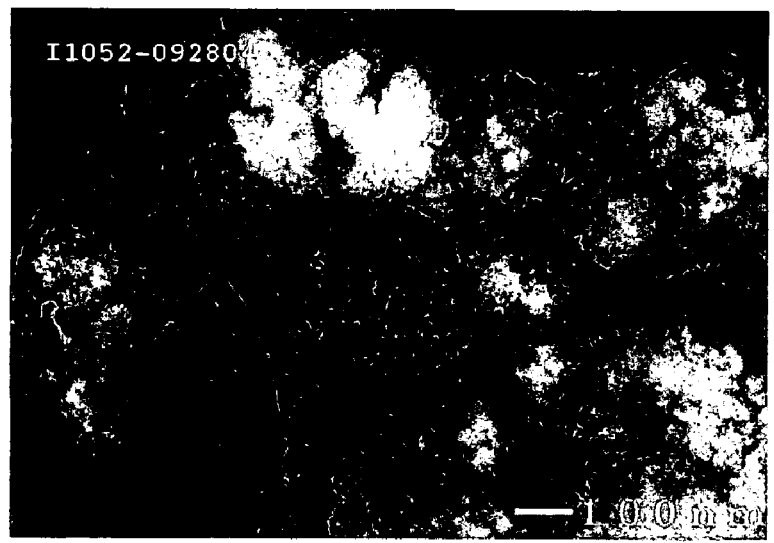
FIG. 27 is a SEM image of a nanostructured Mn-doped $Zr(OH)_4$ sample.
Figure 28:
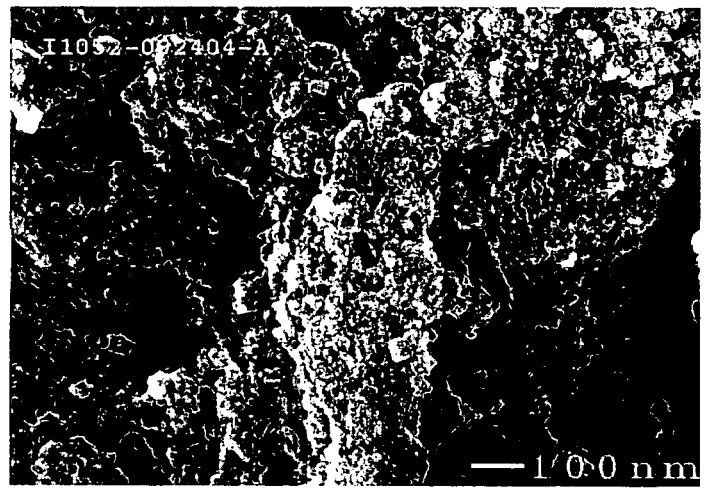
FIG. 28 is a SEM image of a nanostructured Mn-doped $Ti(OH)_4$ sample.

SEM images of undoped zirconium hydroxide, Mn-doped zirconium hydroxide, and Mn-doped titanium hydroxide are shown in FIGS. 26, 27, and 28, respectively. For easy comparison, the images are shown at the same magnification. FIG. 26 indicates that the zirconium hydroxide particles have an average size of about 20 nm, which agglomerate, forming mesopores and macropores between particles. The agglomeration in the Mn-doped zirconium hydroxide, shown in FIG. 27, appears to be to a lesser extent compared with the undoped sample, resulting in a higher total pore volume. No changes in particle size were observed for this sample. Finally, the Mn-doped titanium hydroxide had an average particle size of about 10 nm. These agglomerates, as shown in FIG. 28, do not appear to be as porous as was indicated by pore analysis results. This is due to the material having a significant amount of micropores that are smaller than about 2 nm, which are not visible in the SEM image.

EXAMPLE 7

Evaluation of Titanium- and Zirconium-based Adsorbing Components

In this example, adsorption isotherm tests were used as screening tests to identify the titanium-based and zirconium-based media that possessed the highest As(V) adsorption capacity from each group. The selected media were further evaluated for As(V) adsorption performance under various pHs and influence of competing ions. Finally, rapid small scale column tests were conducted to compare As(V) breakthrough of the selected media and compared with a commercially available benchmark iron-based adsorbent, Granular Ferric Oxide, or GFO.

The particle size of the as-synthesized powders was about 10 micrometers in diameter, which was not directly applicable for column tests. The nanoscale powders were reconstituted into porous spherical particles with an average particle size of approximately 200 micrometers in diameter.

Six different materials, including nanoporous $Zr(OH)_4(s)$ and $Ti(OH)_4(s)$ and their doped forms, were screened using two-day isotherm tests in 200 µg/L As(V) spiked NSF Challenge Water at pH 7.5, as described above in Examples 2 and 5. Dosages of materials in the 2-day isotherms tests and the results are listed in Table 6 and 7 for the zirconium samples and the titanium samples, respectively.

capacities. Like their zirconium counterparts, the Mn-doped titanium-based media outperformed Fe-doped and undoped titanium-based media. Thus, Mn-doped Zr-based and Mn-doped Ti-based media were selected for further evaluation under pH variations and the influence of competing ions.

The ability of these media to adsorb arsenic (V) from the challenge water was evaluated using batch isotherms tests. After developing the isotherms, the data were fitted to the Freundlich equation (2), shown above. The As(V) adsorption isotherm experiments were carried out using common background ions in the solution at three different pHs.

Figure 29:
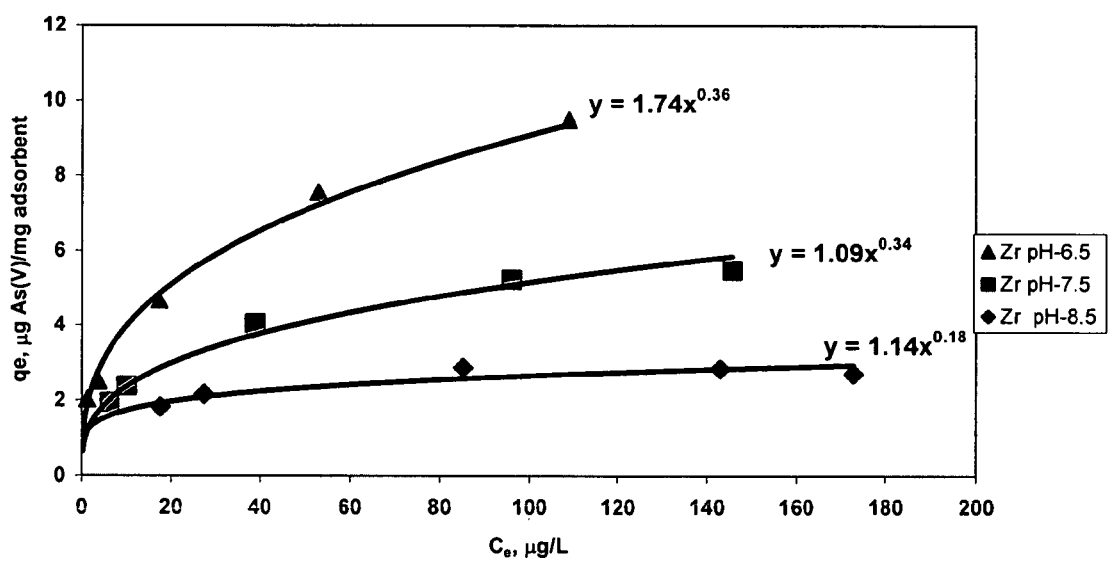
FIG. 29 graphically illustrates As(V) adsorption isotherms for a Mn-doped Zr-based adsorbent at various pH.
Figure 30:
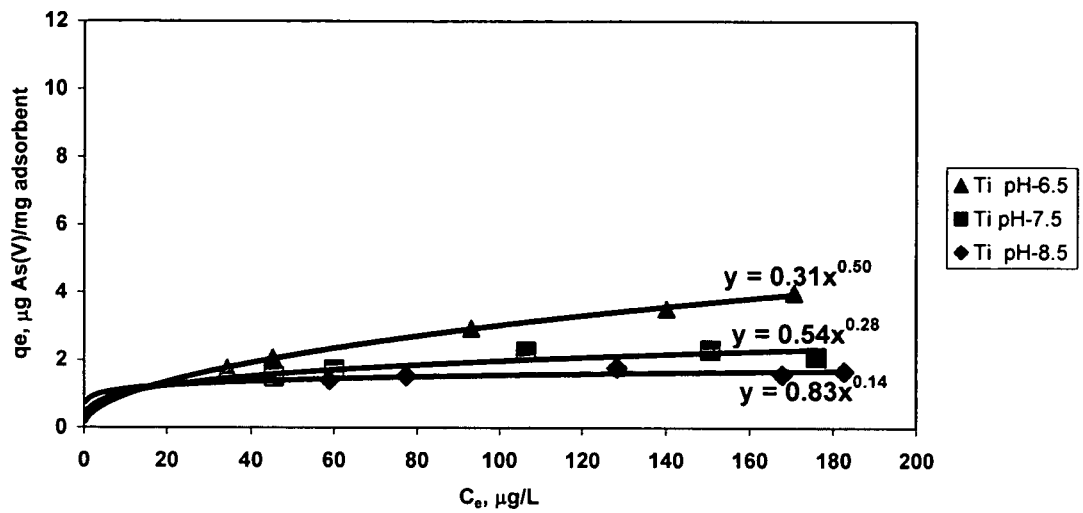
FIG. 30 graphically illustrates As(V) adsorption isotherms for a Mn-doped Ti-based adsorbent at various pH.
Figure 31:
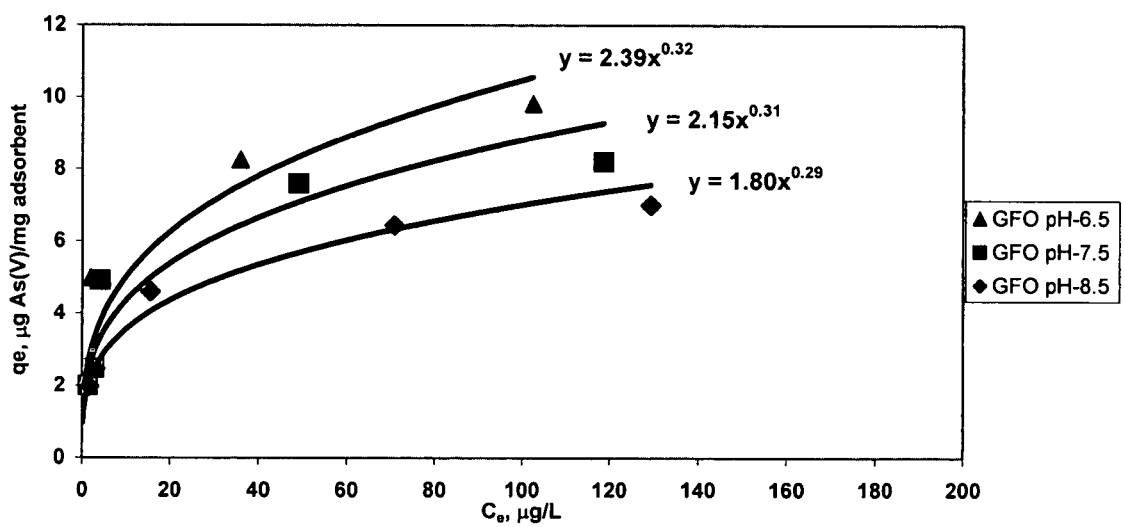
FIG. 31 graphically illustrates As(V) adsorption isotherms for a commercially available adsorbent, GFO, at various pH.

FIG. 29 gives the 2-day As(V) adsorption isotherms of the Zr-based material. FIG. 30 shows the As(V) adsorption capacity of Ti-based material at pHs of about 6.5, about 7.5 and about 8.5. For comparison, the 2-day As(V) adsorption isotherms of GFO at the three different pH's are shown in FIG. 31. As indicated by the data, the As(V) adsorption capacities of the three materials were highest at a pH of about 6.5, with progressively less adsorption of arsenic at a pH of about 7.5 and about 8.5. Irrespective of pH, the GFO exhibited the highest As(V) adsorption capacity among the adsorbents. The Zr-based material exhibited a higher capacity than the Ti-based material at all pHs.

Batch isotherm tests with the NSF challenge water were conducted on the Mn-doped Zr- and Ti-based media at different pH's, with varying concentrations of competing ions including silica (5 and 20 mg/L) and phosphate (0 and 40 µg/L).

First, two-day adsorption isotherms were performed with the challenge water containing 40 µg/L of phosphate (P). These results were compared with challenge water without

TABLE 6

Dosage of Zr-based materials in 2-day isotherms tests and the results

| dosage (mg/L) | Sample ID | Ce | qe | Sample ID | Ce | qe | Sample ID | Ce | qe |
|---|---|---|---|---|---|---|---|---|---|
| 0 | Z-A-0 | 189.58 | 0.00 | Z-B-0 | 192.04 | 0.00 | Z-C-0 | 200.47 | 0.00 |
| 10 | Z-A-1 | 143.10 | 4.65 | Z-B-1 | 183.94 | 0.81 | Z-C-1 | 179.33 | 2.11 |
| 20 | Z-A-2 | 83.24 | 5.32 | Z-B-2 | 170.92 | 1.06 | Z-C-2 | 153.89 | 2.33 |
| 40 | Z-A-4 | 48.13 | 3.54 | Z-B-4 | 138.79 | 1.33 | Z-C-4 | 110.61 | 2.25 |
| 80 | Z-A-8 | 9.40 | 2.25 | Z-B-8 | 110.29 | 1.02 | Z-C-8 | 51.51 | 1.86 |
| 100 | Z-A-10 | 6.76 | 1.83 | Z-B-10 | 88.24 | 1.04 | Z-C-10 | 36.05 | 1.64 |

Sample ID: Z = Zirconium compound; A = Mn-doped, B = undoped, and C = Fe-doped; and the number indicates dosage.

TABLE 7

Dosages of Ti-based materials in 2-day isotherms tests and the results

| dosage (mg/L) | Sample ID | Ce | qe | Sample ID | Ce | qe | Sample ID | Ce | qe |
|---|---|---|---|---|---|---|---|---|---|
| 0 | T-A-0 | 194.94 | 0 | T-B-0 | 196.55 | 0.00 | T-C-0 | 200.58 | 0.00 |
| 10 | T-A-1 | 180.88 | 1.40 | T-B-1 | 190.12 | 0.64 | T-C-1 | 191.93 | 0.86 |
| 20 | T-A-2 | 163.21 | 1.59 | T-B-2 | 179.28 | 0.86 | T-C-2 | 175.35 | 1.26 |
| 40 | T-A-4 | 112.13 | 2.07 | T-B-4 | 143.53 | 1.33 | T-C-4 | 145.80 | 1.37 |
| 80 | T-A-8 | 60.66 | 1.68 | T-B-8 | 113.48 | 1.04 | T-C-8 | 93.98 | 1.33 |
| 100 | T-A-10 | 40.44 | 1.54 | T-B-10 | 87.98 | 1.09 | T-C-10 | 83.71 | 1.17 |

Sample ID: T = Titanium compound; A = Mn-doped, B = undoped, and C = Fe-doped; and the number indicates dosage.

From the As(V) adsorption isotherms of zirconium-based media, it was clear that the Mn-doped zirconium sample possessed the highest adsorption capacity, followed by the Fe-doped media. Undoped media had the lowest adsorption phosphate (P=0 µg/L). For the GFO, phosphate did not have a significant impact on the As(V) adsorption capacity of GFO. Though slightly better adsorption capacities were obtained in the absence of phosphate, it was not significant enough to say that, in the presence of silicate and other background ions, phosphate ions compete with the As(V) for adsorption sites at the tested concentration. The Mn-doped Zr- and Ti-based media followed similar trends. That is, there was no significant difference in absorption between the presence and absence of phosphate in the challenge water containing silicate and other background ions. The summary of the experimental results are presented in Table 8, from which it was concluded that the presence of phosphate did not reduce the adsorption capacities of the adsorbents.

TABLE 8

Comparison of As(V) removal capacities of media at $C_e$ = 50 μg/L

| Media | pH 6.5 | | pH 7.5 | | pH 8.5 | |
|---|---|---|---|---|---|---|
| | P = 0 μg/L | P = 40 μg/L | P = 0 μg/L | P = 40 μg/L | P = 0 μg/L | P = 40 μg/L |
| GFO | 9.32 | 8.35 | 8.7 | 7.22 | 6.35 | 5.59 |
| Zr-based | 6.86 | 7.1 | 3.95 | 4.12 | 3.08 | 2.3 |
| Ti-based | 2.37 | 2.19 | 1.9 | 1.67 | 1.61 | 1.43 |

Next, experiments were performed using the challenge water with the standard concentration of silica (about 20.0 mg/L) and with low silica (about 5.0 mg/L) concentrations to study the effect of silica on adsorption capacities of the GFO, Zr-based and Ti-based media at pHs from about 6.5 to about 8.5. The data is summarized in Table 9. Each of the materials performed better (i.e., adsorbed more As(V)) at the lower concentration of silica. At the higher concentration of silica, the silica competed with As(V) ions for sites on the adsorbents. At a pH of about 6.5 and a silica concentration of about 5.0 mg/L, the Zr-based media exhibited a slightly higher As(V) adsorption capacity than the GFO. The presence of silica greatly reduced the adsorption capacity of the Zr-based material. Under all other conditions, the As(V) adsorption capacity of the Zr-based media was much greater than that of Ti-based media.

TABLE 9

Comparison of As(V) removal capacities (in μg As(V)/mg) at $C_e$ = 50 μg/L with silica at 5 and 20.0 mg/L

| Media | pH 6.5 | | pH 7.5 | | pH 8.5 | |
|---|---|---|---|---|---|---|
| | Si = 5.0 mg/L | Si = 20.0 mg/L | Si = 5.0 mg/L | Si = 20.0 mg/L | Si = 5.0 mg/L | Si = 20.0 mg/L |
| GFO | 9.79 | 8.35 | 8.1 | 7.22 | 7.2 | 5.59 |
| Zr-based | 10.1 | 7.1 | 7.09 | 4.12 | 5.2 | 2.3 |
| Ti-based | 3.46 | 2.19 | 2.57 | 1.67 | 2.29 | 1.43 |

Figure 32:
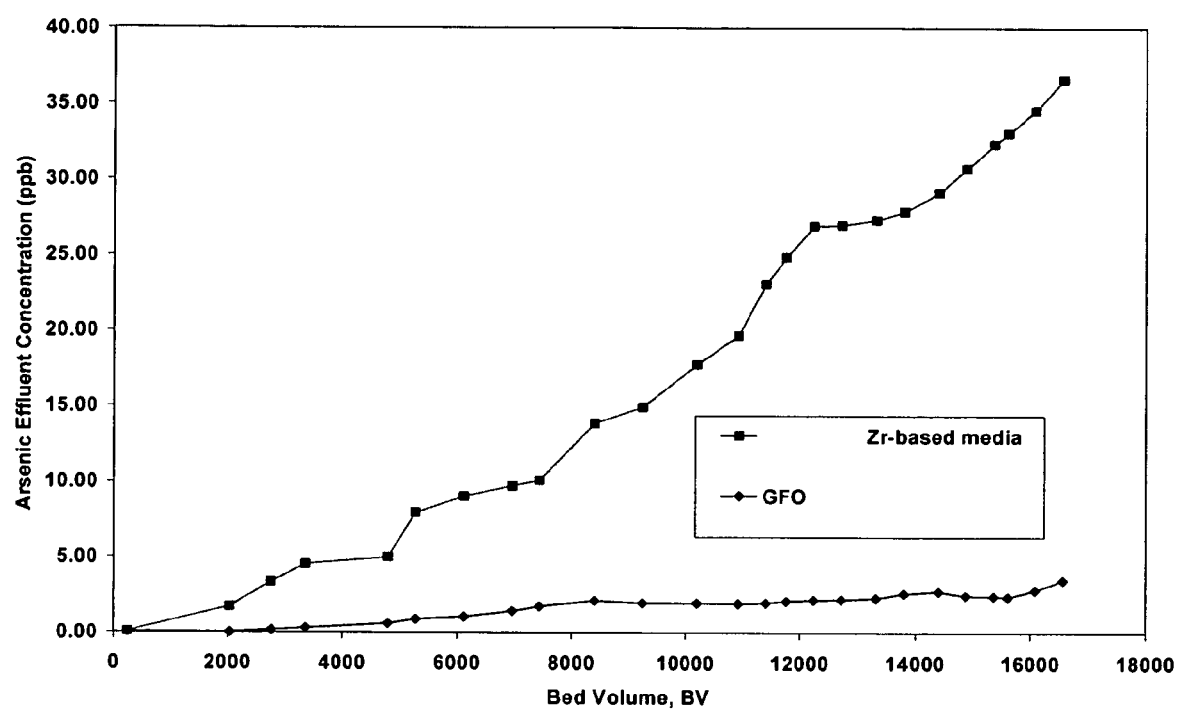
FIG. 32 graphically illustrates the breakthrough curves of As(V) for a a Mn-doped Ti-based adsorbent and GFO at a pH of about 7.5.

RSSCTs were carried out to determine the relative breakthroughs of As(V) for the Zr-based media and the benchmark media, GFO at a pH of about 7.5. The RSSCTs were conducted as described above in Examples 2 and 5. As(V) breakthrough curves for the GFO and the Zr-based media are shown in FIG. 32. The Zr-based media reached the about 10 mg/L MCL at about 6,000 BV throughput, whereas the GFO had reached only about 40% of the MCL after about 16,000 BV.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges directed to the same quantity of a given component or measurement are inclusive of the endpoints and independently combinable.

The invention claimed is:

1. A water treatment composition, comprising:
an oxidizing component; and
an adsorbing component, wherein one or both of the oxidizing component and adsorbing component comprise nanostructured materials, wherein the solid oxidizing component is an iron doped manganese oxide and wherein the water treatment composition is disposed onto a carrier suitable for water treatment or incorporated into a filtration device suitable for water treatment or disposed onto a carrier and incorporated into a filtration device suitable for water treatment.

2. The water treatment composition of claim 1, wherein the one or both of the oxidizing component and adsorbing component comprising the nanostructured materials are agglomerated to form particles having an average longest dimension of at least one micrometer.

3. The water treatment composition of claim 1, wherein the solid oxidizing component further comprises a manganese oxide.

4. The water treatment composition of claim 1, wherein the adsorbing component comprises a titanium-, zirconium-, aluminum-, and/or iron-containing composition.

5. The water treatment composition of claim 1, wherein the adsorbing component comprises an oxide, hydroxide, or oxyhydroxide.

6. The water treatment composition of claim 1, wherein the adsorbing component is doped.

7. The water treatment composition of claim 1, wherein the adsorbing component comprises an iron oxide, manganese-doped iron oxide, lanthanum-doped iron oxide, zirconium hydroxide, manganese-doped zirconium hydroxide, iron-doped zirconium hydroxide, titanium hydroxide, manganese-doped titanium hydroxide, iron-doped titanium hydroxide, or a combination comprising at least two of the foregoing.

8. The water treatment composition claim 1, further comprising a carrier onto which the oxidizing component and/or the adsorbing component is disposed.

9. The water treatment composition of claim 1, further comprising a filtration medium into which the oxidizing component and/or the adsorbing component is embedded.

10. A water treatment composition, comprising:
a nanostructured manganese containing composition; and
a nanostructured adsorbing component, wherein the nanostructured iron-doped manganese oxide composition and the nanostructured adsorbing components are agglomerated to form a particle having an average longest dimension of at least one micro meter and wherein the water treatment composition is disposed onto a carrier suitable for water treatment or incorporated into a filtration device suitable for water treatment or disposed onto a carrier and incorporated into a filtration device suitable for water treatment.

11. The water treatment composition of claim 10, wherein the nanostructured iron-doped manganese oxide composition further comprises manganese oxide.

12. The water treatment composition of claim 10, wherein the nanostructured adsorbing component comprises a titanium-, zirconium-, aluminum-, and/or iron-containing composition.

13. The water treatment composition of claim 10, wherein the nanostructured adsorbing component comprises an iron oxide, manganese-doped iron oxide, lanthanum-doped iron oxide, zirconium hydroxide, manganese-doped zirconium hydroxide, iron-doped zirconium hydroxide, titanium hydroxide, manganese-doped titanium hydroxide, iron-doped titanium hydroxide, or a combination comprising at least two of the foregoing.

14. The water treatment composition of claim 10, further comprising a carrier onto which the oxidizing component and/or the adsorbing component is disposed.

15. The water treatment composition of claim 10, further comprising a filtration medium into which the oxidizing component and/or the adsorbing component is embedded.

16. A method for treating water, comprising
contacting water with the water treatment composition according to claim 1; and
at least partially removing a contaminant from the water.

17. The method of claim 16, wherein the at least partially removing a contaminant comprises:
oxidizing the contaminant; and
adsorbing the oxidized contaminant.

18. The method of claim 16, wherein the contaminant comprises metallic or cationic arsenic, lead, mercury, chromium, or a combination comprising at least one of the foregoing.

* * * * *